US010073186B1

(12) United States Patent
Olsson et al.

(10) Patent No.: US 10,073,186 B1
(45) Date of Patent: Sep. 11, 2018

(54) KEYED CURRENT SIGNAL UTILITY LOCATING SYSTEMS AND METHODS

(71) Applicant: SeeScan Inc., San Diego, CA (US)

(72) Inventors: Mark S. Olsson, La Jolla, CA (US); Stephanie M. Bench, Carlsbad, CA (US); Jan Soukup, San Diego, CA (US); Inho Shin, San Diego, CA (US); Ray Merewether, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 25 days.

(21) Appl. No.: 15/331,570

(22) Filed: Oct. 21, 2016

Related U.S. Application Data

(60) Provisional application No. 62/244,658, filed on Oct. 21, 2015.

(51) Int. Cl.
*G01V 3/10* (2006.01)
*G01V 3/165* (2006.01)
*G01V 3/08* (2006.01)
*G01V 3/15* (2006.01)

(52) U.S. Cl.
CPC ............ *G01V 3/10* (2013.01); *G01V 3/081* (2013.01); *G01V 3/15* (2013.01); *G01V 3/165* (2013.01)

(58) Field of Classification Search
CPC . G01V 3/10; G01V 3/081; G01V 3/15; G01V 3/102; G01V 3/101; E21B 47/224
USPC .................................................. 324/326–329
See application file for complete search history.

(56) References Cited

U.S. PATENT DOCUMENTS

| | | |
|---|---|---|
| 5,155,442 A | 10/1992 | Mercer |
| 5,231,355 A | 7/1993 | Rider et al. |
| 5,260,659 A * | 11/1993 | Flowerdew ............. G01V 3/06 324/326 |
| 5,264,795 A | 11/1993 | Rider |
| 5,337,002 A | 8/1994 | Mercer |
| 5,361,029 A | 11/1994 | Rider et al. |
| 5,633,589 A | 5/1997 | Mercer |
| 5,698,981 A | 12/1997 | Mercer |
| 5,825,297 A | 10/1998 | Walter |
| 5,933,008 A | 8/1999 | Mercer |
| 5,990,683 A | 11/1999 | Mercer |
| 6,079,506 A | 6/2000 | Mercer |
| 6,191,585 B1 | 2/2001 | Mercer |
| 6,411,073 B1 * | 6/2002 | Fischer ................. G01D 21/00 324/133 |
| 6,417,666 B1 | 7/2002 | Mercer |
| 6,457,537 B1 | 10/2002 | Mercer et al. |
| 6,693,429 B2 | 2/2004 | Mercer |
| 2007/0040558 A1 * | 2/2007 | Overby ..................... F16L 1/11 324/326 |

(Continued)

*Primary Examiner* — Jay Patidar
(74) *Attorney, Agent, or Firm* — Steven C. Tietsworth, Esq.

(57) ABSTRACT

Utility locating systems using keyed magnetic field signaling are disclosed. the systems include a utility locating transmitter for generating and outputting one or more different keyed current output signals, where the keyed signals include data defining a utility type or designator a locator sub-system, and corresponding utility locators for receiving keyed magnetic field signals resulting from flow of the keyed output current signals in the utilities and determining locate information and utility type information from the received magnetic field signals.

18 Claims, 12 Drawing Sheets

(56) References Cited

U.S. PATENT DOCUMENTS

| | | | |
|---|---|---|---|
| 2007/0103336 A1* | 5/2007 | Jagiella | G01S 13/06 340/903 |
| 2013/0287125 A1* | 10/2013 | Petherick | H04B 3/04 375/257 |
| 2014/0266212 A1* | 9/2014 | Brune | E21B 47/02 324/326 |

* cited by examiner

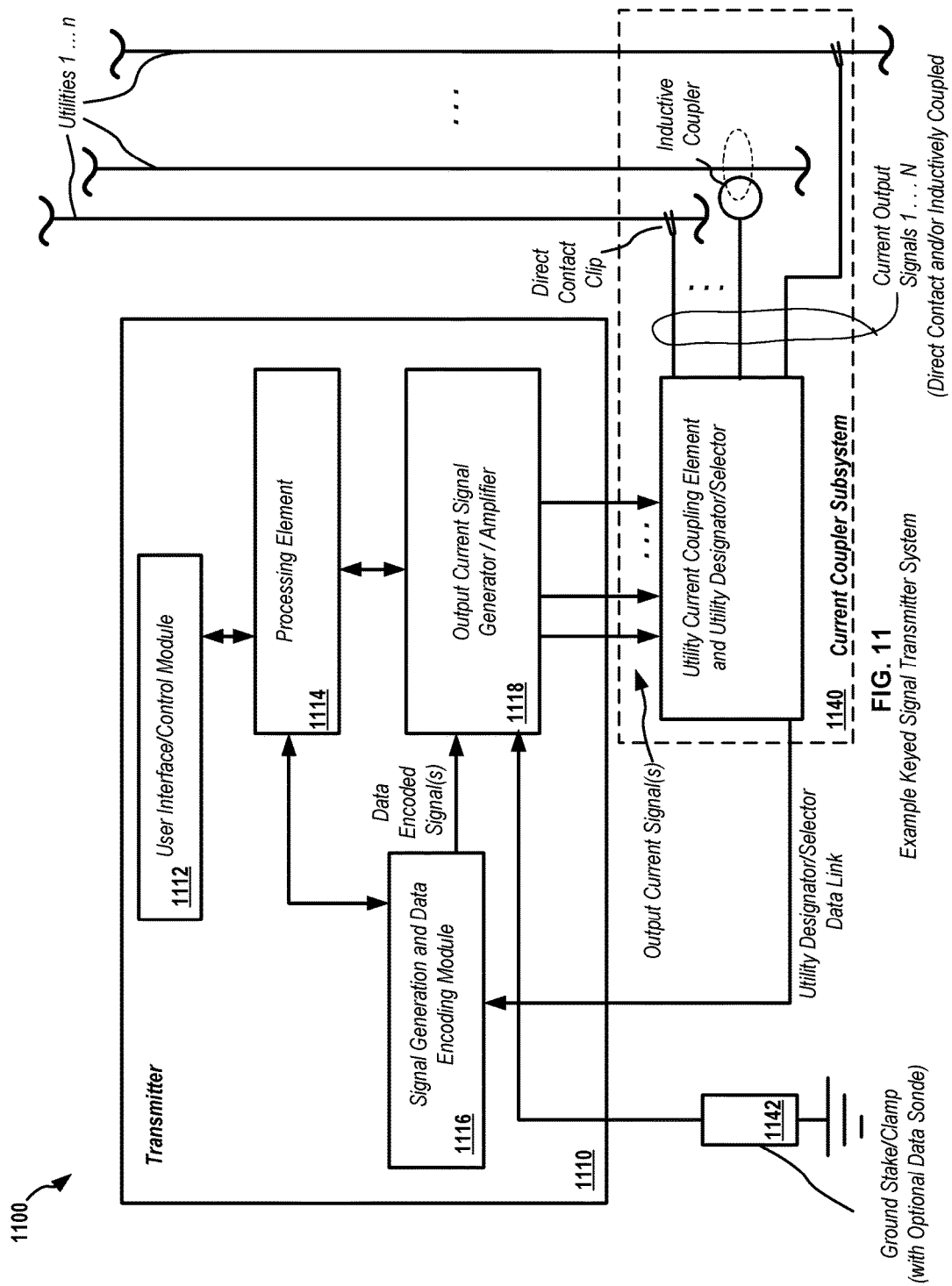

Example Keyed Signal Locator System

KEYED CURRENT SIGNAL UTILITY LOCATING SYSTEMS AND METHODS

CROSS-REFERENCE TO RELATED APPLICATIONS

This application claims priority under 35 U.S.C. § 119(e) to U.S. Provisional Patent Application Ser. No. 62/244,658, entitled SIGNAL KEYING UTILITY LOCATING DEVICES, SYSTEMS, AND METHODS, filed on Oct. 21, 2015, the content of which is incorporated by reference herein in its entirety for all purposes.

FIELD

This disclosure relates generally to electromagnetic utility locating devices, systems, and methods for locating buried or otherwise hidden or obscured utilities or other conductors by sensing magnetic field signals emitted from the utilities or other conductors. More specifically, but not exclusively, the disclosure relates to devices, systems, and methods for generating and providing keyed current output signals from a utility locator transmitter, coupling the keyed current signals to one or more utilities or other conductors to generate current flows therein, and receiving and processing corresponding magnetic field signals resulting from the current flows in a corresponding utility locator to determine information about the utilities and/or other conductors as well as the type of utility being located.

BACKGROUND

Incidents caused by improperly and/or otherwise inaccurately located utility lines have resulted in loss of human life as well as costly damage to infrastructure. In a traditional utility line locating operation (also referred to as a "locate" for brevity), a user moves about a locate area with a portable utility locator to detect magnetic field signals resulting from current flow in the utilities. The signals may be coupled to the utility via a corresponding utility locating system transmitter device (also denoted herein as a "transmitter" for brevity) or, in some cases, currents may flow within the utilities inherently (e.g., in an AC power system, or the current may be coupled to the utility from other sources).

Detection and processing of the magnetic field signals may be used to determine the position of the utility below the ground surface as well as other information such as utility depth and current flow. Typical utility locating systems fail to provide additional useful information beyond basic positional locating (relative to the locator device) such as the type of utility (in environments where there are multiple utilities or other conductors present). Some locating support communication between various system devices to provide more accurate and/or efficient utility locating by sharing information, such as between a locator and a transmitter. However, even in existing systems and devices with inter-communication capabilities, communications and data transfer are often inefficient, limited in information carrying capability, or otherwise lacking.

Accordingly, there is a need in the art to address the above-described as well as other problems.

SUMMARY

Embodiments of the signal keying utility locating systems, devices, and methods (also denoted herein as "keyed" locating devices, systems, and methods for brevity) of the present disclosure may be used to address the aforementioned problems as well as others in the art.

In one aspect, signal keyed utility locating system, method, and device embodiments may include a keyed signal generating transmitter and a locator with a receiving/interpreting element for decoding data in keyed magnetic field signals received at a locator. The transmitting element may generate one or more signals utilizing one or more modulation or signal keying schemes to communicate information between various system devices, such as a utility type associated with a provided output current signal. The signal keying schemes herein may include amplitude shift keying (ASK) or frequency shift keying (FSK) schemes. In an ASK system the amplitudes of the keyed signals are varied. In an FSK system, two (or more) discrete frequencies may be used to transmit/receive information between system devices. In some embodiments, other modulation or signal keying schemes may also be used including, but not limited to phase-shift keying (PSK) and/or other keying schemes, combinations, and/or variations thereof.

The keyed current signal(s) may be coupled to a utility line and/or other conductor, either directly or inductively. The locator and receiving/interpreting element may receive a magnetic field signal resulting from the keyed current signal through a magnetic field antenna array, and may then interpret/decode data encoded in the keyed signal, as well as determine the location and depth of the utility and/or other conductor within the ground, based on the same keyed signal. Embodiments as described herein may include transmitting element(s), locators with receiving and interpreting elements, or both.

The system, device, and method embodiments may include digital filtering techniques such as discrete Fourier transforms (DFTs), FFT, narrowband FIR or IIR digital filters, or other filters in the locators to process received signals and limit bandwidth of the received signal to filter out parts of a keyed signal at the receiver. In some FSK embodiments, frequency separation of keying frequencies may be used so that sample ranges of each DFT and/or other filter centered about each keying frequency may each be inclusive of the reference frequency but exclusive of the other keying frequency to provide signal separation.

In another aspect, keyed signal(s) transmitted and/or received by system devices may be locked to an absolute phase/time reference. Satellite navigation systems sensors such as Global Positioning System (GPS) sensors and/or other accurately synchronized timing devices may be used to lock keyed signals to an absolute phase reference.

In another aspect, keyed output current signals may use a non-return-to-zero and/or other asynchronous encoding scheme to transmit information.

In another aspect, absolute phase and/or current direction of a transmitted signal may be derived from a non-return-to-zero and/or other asynchronous signal keying scheme.

In another aspect, various system devices may use one or more signal keying schemes to transmit data between system devices without impressing such a signal onto a conductive utility line and/or other conductor. Such communication may further use more than one frequency and/or utilizing one or more signal keying schemes. For example, a device embodiment may use an FSK scheme to communicate data to another system device and, in return, receive data via utilizing ASK scheme.

In another aspect, the transmitting and/or receiving/interpreting elements of the various systems and methods herein may be a utility locator device containing hardware, electronics, and/or software to transmit and/or receive/interpret keyed signals from one or more signal keying schemes shared by various other system devices.

In another aspect, the transmitting and/or receiving/interpreting elements of the various systems and methods herein may be a transmitter device containing hardware, electronics, and/or software to transmit and/or receive/interpret keyed signals from one or more signal keying schemes shared by various other system devices.

In another aspect, a system may include various signal coupling devices such as, but not limited to, clamps, clips, and/or induction stick devices that may be configured with hardware and/or software to couple a keyed signal generated from one or more transmitter devices and/or other transmitting element using signal keying schemes shared by various other system devices to a utility line and/or other conductor.

In another aspect, a system may include one or more utility designator devices configured with hardware and/or software to transmit and/or receive/interpret keyed signals from one or more signal keying schemes shared by various other system devices. Such a utility designator device may, for instance, be used to indicate utility type to a utility locator device and/or other receiving/interpreting element.

In another aspect, the transmitting elements of the various systems and methods herein may include a pipe sonde containing associated electronics, hardware, and/or software for transmitting and/or receiving/interpreting/decoding keyed signals from signal keying schemes used in conjunction with other system devices. For example, in systems using a pipe sonde, accelerometer, compass, gyroscopic, and/or other sensors may be used to determine parameters such as orientation, position, tilt of the sonde device, or other parameters. Such information may be communicated back to a signal keying utility locator device and/or other device including a receiving/interpreting element.

In another aspect, the transmitting and/or receiving/interpreting elements of the various systems and methods herein may include an electromagnetic marker device containing hardware and/or software for transmitting and/or receiving/interpreting/decoding keyed signals from signal keying schemes used by other system devices.

In another aspect, the signal keying schemes described herein may be used to facilitate communication of various data. For example, signal keying may be used to indicate utility type to the utility locator device, tilt of a pipe sonde, notate serial number of a product, device type, and/or other information, and may be encoded in data provided from a transmitter or magnetic field sonde.

In another aspect, embodiments may include a phase balanced signal keying scheme. In such a phase balanced keying scheme, modulation between various keying frequencies may be such that any phase shift in one direction may be balanced out with an equal phase shift in the opposite direction such that the overall phase may align with that of the reference frequency over the same time period.

In another aspect, a transmitter system for use with a buried utility locator is disclosed. The transmitter system may include, for example, a signal generation module and data encoding module for generating one or more different signals, and keying data onto the one or more signals. The keyed signals may include data defining a utility type or designator and/or other data or information. The transmitter may further include an output current signal generator module. The output current signal generator module may include an input circuit for receiving the plurality of different keyed signals and an output power amplification and impedance matching circuit for generating one or more current output signals for coupling to a buried utility.

The signal generation module may, for example, generates a plurality of data encoded signals with the keying of ones of the plurality of output signals uniquely representing two or more different utility types or designators. The utility types may include one or more of a gas line, an electrical power line, a water pipe, a sewer pipe, a telecommunication line, a cable television line, and a buried conductor of another type. Ones of the plurality of output current signals may be provided based on or representing corresponding to ones of the plurality of data encoded signals. The keyed signals may be amplitude shift keying (ASK) signals, frequency shift keying (FSK) signals, phase-shift keying (PSK) signals, or other modulated signals.

The transmitter system may, for example, include a utility current coupling element. The coupling element may comprise a utility designator. The utility designator may be installed on or within the coupling element and may be operatively coupled to the coupling element to for providing a signal to the signal generation module representing a utility type or designator on which a current output signal from the transmitter is coupled to. The utility type may alternately, or in addition, be identified by a user input to the transmitter via a wired or wireless connection. The utility current coupling element may be a direct contact clip, and the utility designator is operatively coupled to the direct contact clip inline or on or connected to the direct contact clip. The utility current coupling element may include an inductive coupler and the utility designator may be operatively coupled to the inductive coupler inline or on or connected to the inductive coupler. The utility current coupling element may be an induction stick and the utility designator may be operatively coupled to the induction stick online or may be connected to the induction stick. The signal provided to the signal generation module may represent a utility type may be based on a user input to a user interface/control module of the transmitter and may be provided from the user interface/control module.

The transmitter system may include one or more magnetic field dipole data sondes. A magnetic field signal provided from the one or more data sondes may includes data representing one or both of a ground stake or clamp and a utility designator. The magnetic field dipole data sondes may be on or coupled to the ground stake or clamp or the utility designator. The magnetic field data sonde may send data representing a corresponding utility designator or ground stake or clamp that can be received and processed by a corresponding utility locator to provide locate information about the magnetic field data sonde and data representing the type of sonde as a ground stake clamp sonde or a utility designator sonde. The utility designator data from the sonde may include data representing a utility type defined by the utility designator.

In another aspect, a keyed signal utility locator is disclosed. The locator may include, for example, a locator housing, a magnetic field antenna array, which may be coupled to or disposed on or attached to the housing or a mast element of the locator. The locator may include a locator receiver module coupled to an output of the magnetic field antenna array for determining locate information associated with one or more buried utilities based on a keyed magnetic field signal received at the magnetic field antenna array. The locate information may include a position of the buried utility, a depth of the buried utility, current flow information associate with current flowing the buried utility, and/or other locate data or information. The locator may further include an interpretation/decoding module to decode a utility type associated with keying imposed on a magnetic field signal received at the magnetic field antenna array. The interpretation/decoding module may include a modulation receiver to decode modulated data, such as an ASK, FSK, or PSK receiver and associated signal processing electronics. The locator may include a processing element and non-transitory memory for associating the determined locate information and the utility type data, and storing the associated locate information and utility type data in the non-transitory memory. The utility type data and associated locate data may be displayed on a visual display of the locator and/or may be sent from the locator, via a wired or wireless communications module, to another communicatively coupled device or system, such as a cellular phone, a tablet device, a portable computer, and the like. The keyed magnetic field signal may be ASK keyed or may be FSK keyed. The interpretation/decoding module may decode a received keyed magnetic field sonde signal provided from a utility designator or a ground stake or clamp and may, in conjunction with a processing element of the locator, associate locate data of the utility designator or ground stake location with the decoded keyed magnetic field sonde signal and stores the associated data in a non-transitory memory of the locator.

In another aspect, a utility locating system using keyed magnetic field signaling is disclosed. The system may include, for example, a transmitter sub-system comprising a utility locator transmitter including a signal generation module and data encoding module for generating ones of a plurality of different keyed signals, wherein the keyed signals include data defining a utility type or designator, and an output current signal generator module for receiving the plurality of different keyed signals and generating one or more current output signals for coupling to a buried utility. The system may further include a locator sub-system, comprising a locator housing, a magnetic field antenna array, a locator receiver module coupled to an output of the magnetic field antenna array for determining locate information associated with one or more buried utilities based on a keyed magnetic field signal received at the magnetic field antenna array, where the keyed magnetic field signal is generated by flow of one or more of the current output signals in the buried utility, an interpretation/decoding module to decode a utility type associated with keying imposed on a magnetic field signal received at the magnetic field antenna array, and a processing element and non-transitory memory for associating the locate information and the utility type data and storing the associated locate information and utility type data in the non-transitory memory.

In another aspect, a method of locating buried utilities and identifying utility types is disclosed. The method may include, for example, generating, in a utility locator transmitter, ones of a plurality of different keyed signals, wherein the keyed signals include data defining a utility type or designator and receiving, in the utility locator transmitter, the plurality of different keyed signals, generating one or more current output signals based on the plurality of different keyed signals, providing the one or more current output signals to a coupling element for coupling the one or more current signals to a buried utilities, receiving, in a utility locator, a keyed magnetic field signal emitted from the buried utility based in flow of one or more of the keyed current signals in the buried utility, determining locate information associated with the buried utilities based on the keyed magnetic field signal, decoding a utility type associated with keying imposed on a magnetic field signal received at the magnetic field antenna array, associating the locate information and the utility type data, and storing the associated locate information and utility type data in the non-transitory memory.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 11 illustrates details of one embodiment of a signal keyed utility locator transmitter system.

DETAILED DESCRIPTION OF EMBODIMENTS

Overview

Figure 1:
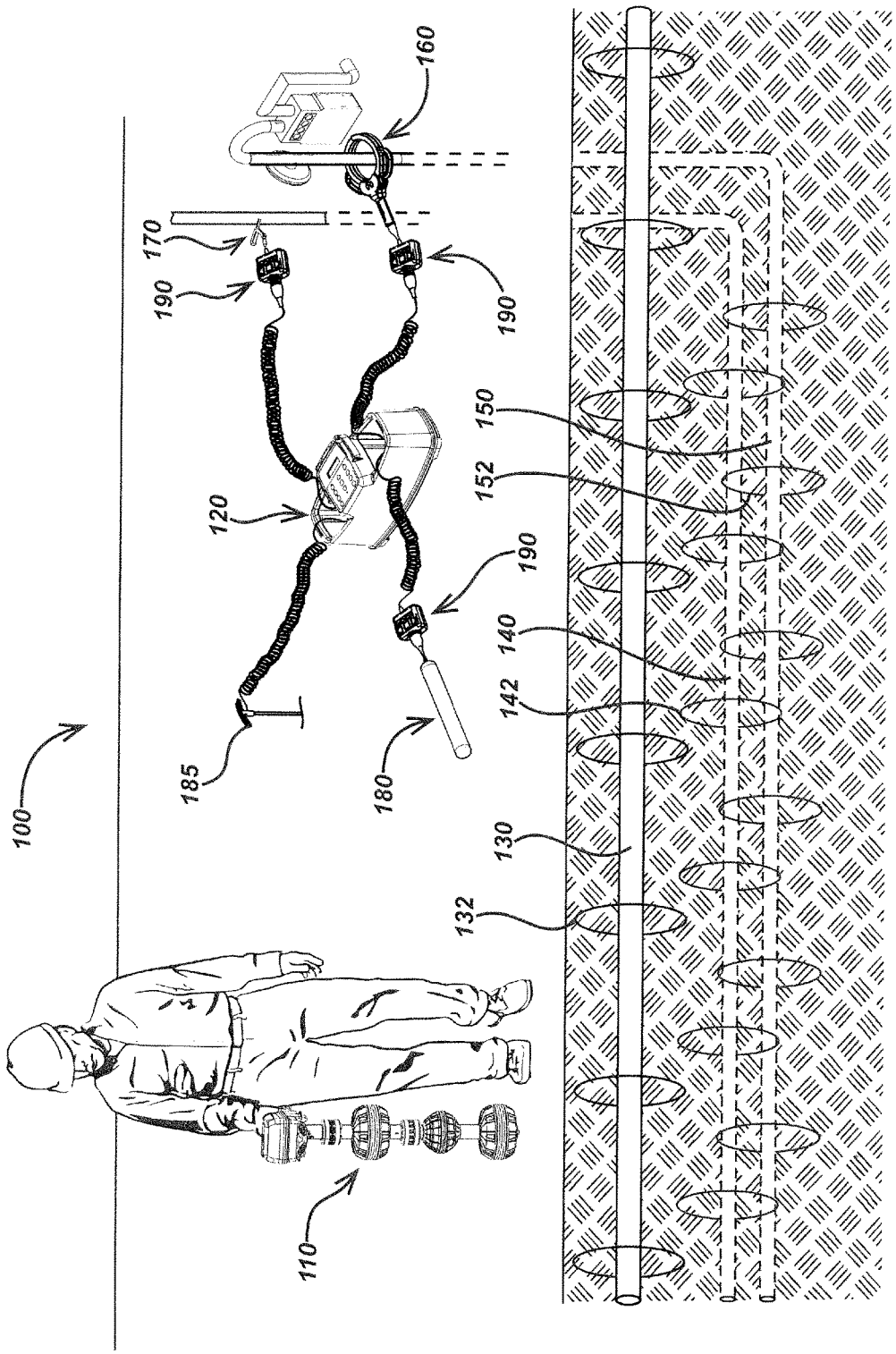
FIG. 1 is an illustration of one embodiment of a signal keying utility locating system.

The signal keying utility locating systems, devices, and methods (also denoted herein as "keyed" locating devices, systems, and methods for brevity) of the present disclosure may be used to address the problems mentioned in the Background section as well as other problems in the field. Such systems, methods, and devices may include at least one transmitting element and one receiving/interpreting element. The transmitting element may generate one or more signals utilizing one or more modulation or signal keying schemes to communicate information between various system devices. The signal keying schemes herein may include frequency shift keying (FSK) schemes where alternating between two discrete frequencies may be used to transmit/receive information between system devices. In some embodiments, other modulation or signal keying schemes may also be used including, but not limited to phase-shift keying (PSK) and/or amplitude-shift keying (ASK) schemes and/or other similar keying schemes, combinations, and/or variations thereof. Such a keyed signal may further be coupled to a utility line and/or other conductor. The receiving/interpreting element may receive the keyed signal coupled to the utility line and/or other conductor and interpret/decode information encoded within as well as determine the location and depth of the utility and/or other conductor within the ground based on the same keyed signal. Various system devices as described herein may include transmitting elements or receiving interpreting elements or both.

Additional details of utility locator devices, transmitter devices, signal coupling devices, utility designator devices, sondes, and electromagnetic marker devices that may be used in embodiments in conjunction with the disclosures herein are described in co-assigned patent applications including: U.S. Pat. No. 7,221,136, issued Jul. 8, 2004, entitled Sondes for Locating Underground Pipes and Conduits; U.S. Pat. No. 7,619,516, issued Mar. 11, 2005, entitled Single and Multi-Trace Omnidirectional Sonde and Line Locators and Transmitter Used TherewitH; U.S. Pat. No. 7,009,399, issued Mar. 7, 2006, entitled Omnidirectional Sonde and Line Locator; U.S. Pat. No. 7,136,765, issued Nov. 14, 2006, entitled A Buried Object Locating and Tracing Method and System Employing Principal Components Analysis for Blind Signal Detection; U.S. Pat. No. 7,332,901, issued Feb. 19, 2008, entitled Locator with Apparent Depth Indication; U.S. Pat. No. 7,336,078, issued Feb. 26, 2008, entitled Multi-Sensor Mapping Omni-Directional Sonde and Line Locators and Transmitter Used Therewith; U.S. Pat. No. 8,248,056, issued Oct. 31, 2008, entitled A Buried Object Locator System Employing Automated Virtual Depth Event Detection and Signaling; U.S. Pat. No. 8,400,154, issued Feb. 6, 2009, entitled Locator Antenna with Conductive Bobbin; U.S. Pat. No. 7,498,816, issued Mar. 2, 2009, entitled Omnidirectional Sonde and Line Locator; U.S. Pat. No. 7,498,797, issued Mar. 3, 2009, entitled Locator with Current-Measuring Capability; U.S. Pat. No. 7,557,559, issued Jul. 7, 2009, entitled Compact Line Illuminator; U.S. Pat. No. 7,755,360, issued Jul. 13, 2010, entitled Portable Locator System with Jamming Reduction; U.S. Pat. No. 7,741,848, issued Sep. 22, 2010, entitled Adaptive Multichannel Locator System for Multiple Proximity Detection; U.S. Pat. No. 7,825,647, issued Nov. 2, 2010, entitled Compact Line Illuminator for Locating Buried Pipes and Cables; U.S. patent application Ser. No. 12/947,503, filed Nov. 16, 2010, entitled IMAGE-BASED MAPPING LOCATING SYSTEM; U.S. Pat. No. 9,057,754, issued Mar. 4, 2011, entitled Economical Magnetic Locator Apparatus and Method; U.S. Pat. No. 7,969,151, issued Jun. 28, 2011, entitled Pre-Amplifier and Mixer Circuitry for a Locator Antenna; U.S. patent application Ser. No. 13/189,844, filed Jul. 25, 2011, entitled BURIED LOCATOR SYSTEMS AND METHODS; U.S. Pat. No. 7,990,151, issued Aug. 2, 2011, entitled Tri-Pod Buried Locator System; U.S. Pat. No. 8,013,610, issued Sep. 6, 2011, entitled High Q Self-Tuning Locating Transmitter; U.S. Pat. No. 8,035,390, issued Oct. 11, 2011, entitled Omnidirectional Sonde and Line Locator; U.S. Pat. No. 8,106,660, issued Jan. 31, 2012, entitled Sonde Array for Use with Buried Line LocatoR; U.S. patent application Ser. No. 13/493,883, issued Jun. 11, 2012, entitled MAGNETIC SENSING BURIED OBJECT LOCATOR INCLUDING A CAMERA; U.S. Pat. No. 8,203,343, issued Jun. 19, 2012, entitled Reconfigurable Portable Locator Employing Multiple Sensor Arrays Having Flexible Nested Orthogonal Antennas; U.S. patent application Ser. No. 13/584,799, issued Aug. 13, 2012, entitled BURIED OBJECT LOCATOR SYSTEMS AND METHODS; U.S. patent application Ser. No. 13/602,303, filed Sep. 3, 2012, entitled WIRELESS BURIED PIPE AND CABLE LOCATING SYSTEMS; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled System and Method for Locating Buried Pipes and Cables with a Man Portable Locator and a Transmitter in a Mesh Network; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/793,168, filed Mar. 3, 2013, entitled BURIED OBJECT LOCATORS WITH CONDUCTIVE ANTENNA BOBBINS; U.S. patent application Ser. No. 13/797,711, filed Mar. 6, 2013, entitled DUAL SENSED LOCATING SYSTEMS AND METHODS; U.S. patent application Ser. No. 13/850,181, filed Mar. 25, 2013, entitled GRADIENT ANTENNA COILS AND ARRAYS FOR USE IN LOCATING SYSTEMS; U.S. patent application Ser. No. 13/851,851, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL GROUND TRACKING APPARATUS, SYSTEMS AND METHODS; U.S. patent application Ser. No. 14/080,582, filed Nov. 14, 2013, entitled MULTI-FREQUENCY LOCATING SYSTEMS AND METHODS; U.S. Pat. No. 8,547,428, issued Oct. 1, 2013, entitled Pipe Mapping System; U.S. patent application Ser. No. 14/053,401, filed Oct. 14, 2013, entitled BURIED OBJECT LOCATING DEVICES AND METHODS; U.S. patent application Ser. No. 14/148,649, filed Jan. 6, 2014, entitled MAPPING LOCATING SYSTEMS AND METHODS; U.S. patent application Ser. No. 14/154,128, filed Jan. 13, 2014, entitled UTILIY LOCATOR SYSTEMS AND METHODS; U.S. patent application Ser. No. 14/179,538, filed Feb. 12, 2014, entitled OPTICAL GROUND TRACKING APPARATUS, SYSTEMS, AND METHODS; U.S. patent application Ser. No. 14/229,813, filed Mar. 28, 2014, entitled UTILITY LOCATOR TRANSMITTER APPARATUS AND METHODS; U.S. patent application Ser. No. 14/321,699, filed Jul. 1, 2014, entitled UTILITY LOCATOR APPARATUS, SYSTEMS, AND METHODS; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,279, filed Jul. 29, 2014, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. patent application Ser. No. 14/733,810, filed Jun. 8, 2015, entitled ECONOMICAL MAGNETIC LOCATOR APPARATUS AND METHODS; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. Pat. No. 9,081,109, issued Jul. 14, 2015, entitled Ground-Tracking Devices for Use with a Mapping Locator; U.S. patent application Ser. No. 14/800,490, filed Jul. 15, 2015, entitled UTILITY LOCATOR TRANSMITTER DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled Marking Paint Applicator for Portable Locator; U.S. Provisional Patent Application 62/209,824, filed Aug. 25, 2015, entitled COMBINED PASSIVE AND ACTIVE UTILITY LOCATING DEVICES, SYSTEMS, AND METHODS; U.S. Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, UTILITY LOCATING SYSTEMS, DEVICES, AND METHODS USING RADIO BROADCAST SIGNALS; U.S. Provisional Patent Application 62/295,502, filed Feb. 16, 2016, entitled BURIED UTILITY MARKER DEVICES, SYSTEMS, AND METHODS; U.S. Provisional Patent Application 62/307,365, filed Mar. 11, 2016, entitled UTILITY LOCATOR SUPPORT STRUCTURES; U.S. Pat. No. 9,341,740, issued May 17, 2016, entitled Optical Ground Tracking Apparatus, Systems, and Methods; U.S. patent application Ser. No. 15/187,785, filed Jun. 21, 2016, entitled BURIED UTILITY LOCATOR GROUND TRACKING APPARATUS, SYSTEMS, AND METHODS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,372,117, issued Jun. 21, 2016, entitled Optical Ground Tracking Methods and Apparatus for Use with Buried Utility Locators; U.S. patent application Ser. No. 15/225,623, filed Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,067, issued Aug. 9, 2016, entitled Ground-Tracking Systems and Apparatus; U.S. Pat. No. 9,411,066, issued Aug. 9, 2016, entitled Sondes and Methods for use with Buried Line Locator Systems; U.S. patent application Ser. No. 15/247,503, filed Aug. 25, 2016, entitled LOCATING DEVICES, SYSTEMS, AND METHODS USING FREQUENCY SUITES FOR UTILITY DETECTION; and U.S. Pat. No. 9,435,907, issued Sep. 6, 2016, entitled Phase Synchronized Buried Object Locator Apparatus, Systems, and Methods. The content of each of these patents and applications is incorporated by reference herein in its entirety. These applications and patents may be referred to collectively herein as the "incorporated applications."

In one aspect, FSK transmitting methods herein may choose two keying frequencies spaced closely higher and lower with a reference frequency in between. The reference frequency may be commonly employed in known utility locating operations. In some such embodiments, non-signal keying utility locator device and/or other receiving elements receiving a keyed signal from a transmitting element in keeping with the present disclosure may still utilize the keyed signal to determine the utilities location and depth within the ground in systems where the bandwidth occupied by the keyed signal is within the passband bandwidth of the utility locator device.

In another aspect, systems, devices, and methods of the present disclosure may include digital filtering techniques such as the use of discrete Fourier transforms (DFTs). In some embodiments, frequency separation of keying frequencies may be selected such that sample ranges of each DFT and/or other filter centered about each keying frequency may each be inclusive of the reference frequency but exclusive of the other keying frequency.

In another aspect, keyed signals transmitted and/or received by the various system devices may be locked to an absolute phase reference. Satellite navigation systems sensors such as Global Positioning System (GPS) sensors and/or other accurately synchronized timing devices may be used to lock keyed signals to an absolute phase reference.

In another aspect, the signals transmitted may employ a non-return-to-zero and/or other asynchronous encoding scheme to transmit information.

In another aspect, absolute phase and/or current direction of a transmitted signal may be derived from a non-return-to-zero and/or other asynchronous signal keying scheme in keeping with the present disclosure.

In another aspect, various system devices may use one or more signal keying schemes to transmit data between system devices without impressing such a signal onto a conductive utility line and/or other conductor. Such communication may further occur via more than one frequency and/or utilizing one or more signal keying schemes. For instance, a system device in keeping with the present disclosure may use an FSK scheme to communicate data to another system device and, in return, receive data utilizing an ASK scheme.

In another aspect, the transmitting and/or receiving/interpreting elements of the various systems and methods herein may be a utility locator including hardware, electronics, and/or software for transmitting and/or receiving/interpreting keyed signals from one or more signal keying schemes shared by various other system devices.

In another aspect, the transmitting and/or receiving/interpreting elements of the various systems and methods herein may include a transmitter device with hardware, electronics, and/or software configured to transmit and/or receive/interpret keyed signals from one or more signal keying schemes shared by various other system devices.

In another aspect, a system embodiment may include various signal coupling devices for coupling keyed transmitter output current signals to utilities such as, but not limited to, clamps, clips, inductive couplers, and/or induction stick devices.

In another aspect, a system embodiment may include one or more utility designator devices having hardware, electronics, and/or software to send and/or receive/interpret keyed signals from one or more signal keying schemes shared by various other system devices. Such a utility designator device may, for instance, be used to indicate utility type to a utility transmitter so that the transmitter can encode output current signals accordingly based on a user-selected utility type.

In another aspect, the transmitting elements of the various systems and methods herein may include a pipe sonde device with associated devices, hardware and/or software for transmitting and/or receiving/interpreting keyed signals from one or more signal keying schemes shared by various other system devices. For example, in systems using a pipe sonde device, accelerometer, compass, gyroscopic, and/or other sensors may be used to determine, for instance, tilt of the sonde device. Such information, such as tilt, may be communicated back to a signal keying utility locator device and/or other receiving/interpreting element.

In another aspect, the various signal keying schemes in keeping with the present disclosure may facilitate communication of various types of data. For example, a signal keying scheme may be used to indicate utility type to the utility locator device, tilt of a pipe sonde, notate serial number of a product, device type, and/or other information.

In another aspect, embodiments may include phase balanced signal keying. In such a phase balanced keying scheme, modulation between various keying frequencies may be used such that any phase shift in one direction is balanced out with an equal phase shift in the opposite direction so that the overall phase aligns with that of the reference frequency over the same time period.

In another aspect, a transmitter system for use with a buried utility locator is disclosed. The transmitter system may include, for example, a signal generation module and data encoding module for generating one or more different signals, and keying data onto the one or more signals. The keyed signals may include data defining a utility type or designator and/or other data or information. The transmitter may further include an output current signal generator module. The output current signal generator module may include an input circuit for receiving the plurality of different keyed signals and an output power amplification and impedance matching circuit for generating one or more current output signals for coupling to a buried utility.

In another aspect, an embodiment of a keyed signal utility locator is disclosed. The locator may include, for example, a locator housing, a magnetic field antenna array, which may be coupled to or disposed on or attached to the housing or a mast element of the locator. The locator may include a locator receiver module coupled to an output of the magnetic field antenna array for determining locate information associated with one or more buried utilities based on a keyed magnetic field signal received at the magnetic field antenna array. The locate information may include a position of the buried utility, a depth of the buried utility, current flow information associate with current flowing the buried utility, and/or other locate data or information.

The locator may further include an interpretation/decoding module to decode a utility type associated with keying imposed on a magnetic field signal received at the magnetic field antenna array. The interpretation/decoding module may include a modulation receiver to decode modulated data, such as an ASK, FSK, or PSK receiver and associated signal processing electronics. The locator may include a processing element and non-transitory memory for associating the determined locate information and the utility type data, and storing the associated locate information and utility type data in the non-transitory memory. The utility type data and associated locate data may be displayed on a visual display of the locator and/or may be sent from the locator, via a wired or wireless communications module, to another communicatively coupled device or system, such as a cellular phone, a tablet device, a portable computer, and the like. The keyed magnetic field signal may be ASK keyed or may be FSK keyed. The interpretation/decoding module may decode a received keyed magnetic field sonde signal provided from a utility designator or a ground stake or clamp and may, in conjunction with a processing element of the locator, associate locate data of the utility designator or ground stake location with the decoded keyed magnetic field sonde signal and stores the associated data in a non-transitory memory of the locator.

In another aspect, an embodiment of a utility locating system using keyed magnetic field signaling is disclosed. The system may include, for example, a transmitter subsystem comprising a utility locator transmitter including a signal generation module and data encoding module for generating ones of a plurality of different keyed signals, wherein the keyed signals include data defining a utility type or designator, and an output current signal generator module for receiving the plurality of different keyed signals and generating one or more current output signals for coupling to a buried utility. The system may further include a locator sub-system, comprising a locator housing, a magnetic field antenna array, a locator receiver module coupled to an output of the magnetic field antenna array for determining locate information associated with one or more buried utilities based on a keyed magnetic field signal received at the magnetic field antenna array, where the keyed magnetic field signal is generated by flow of one or more of the current output signals in the buried utility, an interpretation/decoding module to decode a utility type associated with keying imposed on a magnetic field signal received at the magnetic field antenna array, and a processing element and non-transitory memory for associating the locate information and the utility type data and storing the associated locate information and utility type data in the non-transitory memory.

In another aspect, an embodiment of a method of locating buried utilities and identifying utility types is disclosed. The method may include, for example, generating, in a utility locator transmitter, ones of a plurality of different keyed signals, wherein the keyed signals include data defining a utility type or designator and receiving, in the utility locator transmitter, the plurality of different keyed signals, generating one or more current output signals based on the plurality of different keyed signals, providing the one or more current output signals to a coupling element for coupling the one or more current signals to a buried utilities, receiving, in a utility locator, a keyed magnetic field signal emitted from the buried utility based in flow of one or more of the keyed current signals in the buried utility, determining locate information associated with the buried utilities based on the keyed magnetic field signal, decoding a utility type associated with keying imposed on a magnetic field signal received at the magnetic field antenna array, associating the locate information and the utility type data, and storing the associated locate information and utility type data in the non-transitory memory.

Various additional aspects, features, and functions are described below in conjunction with FIGS. 1 through 12 of the appended Drawings.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Signal Keying Utility Locating Devices, Systems, and Methods

An exemplary keyed signal utility locating system includes a utility locator transmitting element (also referred to herein as a locating transmitter or simply a "transmitter" for brevity) for generating and providing one or more data keyed output current signal for coupling to a utility line and/or other conductor. As used herein the term "keyed" and "keying" refers to a form of modulation wherein the modulating signal takes one of a specified predetermined number of amplitude, frequency, or phase values over defined time intervals. The amplitude, frequency, and phase values may change in different time intervals in the keyed signal based on applied data. For example, a simple implementation would use amplitude shift keying with two or more different amplitudes to each represent a data bit or bits. Frequency shift keying (FSK) or phase shift keying (PSK) may also be used in some embodiments to send data. In some embodiments other forms of modulation may alternately be used in addition to or in place of keyed signaling.

Modulation is the general technique of shaping a signal to convey information. When a digital message has to be represented as an analog waveform, the technique and term keying (or digital modulation) is used. Keying is characterized by the fact that the modulating signal will have a limited number of states (or values) at all times, to represent the corresponding digital states (commonly zero and one, although this might depend on the number of symbols used). Various keying techniques exist, amplitude shift keying, including phase-shift keying, and frequency-shift keying.

In a typical implementation, data keyed on a current signal applied to a utility includes data corresponding to a particular type of utility on which the current is applied and/or a utility designator (e.g., utility 1, 2, . . . n, or for multiple instances of a particular type of utility). For example, a particular data encoding may be used to represent a gas line, while another may be used to represent a water or sewer pipe, with other encoding used to identify other types of utilities such at telecommunication ("telco"), sewer, power utilities, and the like. In some embodiments utility designation data may be used to represent two or more instances of a particular utility type, such as where two or more gas or water lines are present in a locate site.

The type of utility may be set by a user using a utility selector device, which may be included or connected to a utility coupling mechanism such as a clamp or inductive coupler. In operation a user may select the utility type at the utility selector, and data corresponding to the selected utility type may be sent to the transmitter via wired or wireless communication links between the two. In some embodiments the transmitter may include a user interface where a user can directly enter a utility type associated with a particular transmitter keyed output current signal.

At the transmitter, the output current signals may be keyed based on the selected utility type and provided via an output circuit, such as an electronic power amplifier or other output circuit device, to a cable that is terminated at a clamp (for direct contact coupling of the current) or an inductive device such as an inductive coupler or induction stick (for inductive coupling via a magnetic field).

After being coupled directly or inductively to the utility, the keyed output current signal flows in the utility, generating a corresponding magnetic field which includes the data keying. The magnetic field may be received in a receiver module of the buried utility locator (also denoted herein as a "utility locator" or simply a "locator" for brevity) and then be processed by a decoder/interpretation module of the locator to decode the data to identify the particular type of utility that the signal is coming from. The received magnetic field signals may be processed using, for example, well-known locator signal processing to determine information about the utility such as its position (relative to the ground surface), depth, current flow and direction, and the like. In addition, by decoding the data in the keyed signal utility type information may also be determined in the locator and may be stored in a non-transitory memory of the locator along with the other locator data. Additional information such as positional data (e.g., as determined by a GPS receiver module in the locator) may also be determined and stored with the utility type and other locator information in the memory. In some embodiments as further described below, keying may also be used with magnetic field dipole sondes to provide information about the sonde type and/or where the sonde is position or what type of device it is coupled to or associated with. Examples include sondes associated with ground stakes or clamps, as well as sondes associated with utility locator designators. These sondes may use keying corresponding to their associated device, and the sonde may be position-located by a locator similarly to utilities, with the sonde data associated with the corresponding locate data.

Turning to FIG. 1, an exemplary signal keying locating system 100 is illustrated. System 100 includes a signal keyed utility locator transmitter 120 for generating and outputting the data keyed current signal for coupling to a buried utility. An associated a coupling apparatus, such as direct contact clips or inductive couplers, are coupled to the keyed transmitter current output signals to couple the current signal to the utility.

The utility type and/or other data may be included in the data keyed in the current signal as provided as output from the transmitter 120. In an exemplary embodiment the keyed current output signal includes data defining a particular utility type in which the current is flowing in (and correspondingly which is being located). In some embodiments, a suite of output current signals at different frequencies may be provided as the output from the current transmitter. The suite of signals may all be encoded with the same data or, in some embodiments, a subset of frequencies in the suite may be encoded with the data. In some embodiments, different suites of frequencies may be provided for each utility type output from the transmitter so that the utility type may be distinguished by the particular set of received signal frequencies at the locator, either with or without added data. Various details of embodiments of utility locator transmitters are described in the incorporated references.

Once the output current signal(s) are coupled to the utility, current flow in the utility will result in a corresponding magnetic field, typically in the form of circular magnetic fields about the conductor. In implementations using sondes, the field will be a dipole magnetic field. These magnetic field signals may then be detected by an associated locator using techniques and apparatus as are known or developed in the art. Various example locator devices and methods are described in the incorporated applications.

The associated utility locator 110 may receive, via one or more magnetic field antenna arrays and a corresponding receiver circuit, signals corresponding to the output current signals, including the added data. Details of various embodiments of locator receiver and signal processing circuits as may be used in various embodiments are described in the incorporated applications. The receiver output(s) may be processed as is done in locator circuitry to determine the utility location, depth, current, and the like.

In addition, the data decoder/interpretation module of the locator may include circuitry for decoding the keyed signal (e.g., for an ASK signal a corresponding ASK receiver circuit and associated signal processing circuitry, and similarly for other types of modulation). The data, including the decoded utility type and/or other data provided from the transmitter, may then be associated with the other utility locator information (e.g., position, utility depth, current data, phase data, etc.) and stored in a non-transitory memory of the locator. The data may also be rendered on a visual display of the locator and/or may be presented as audio output or other output. In addition, the data may be sent to another utility locator system device such as a portable computer, cellular phone or tablet, or other wired or wirelessly coupled system device. For example, as shown in FIG. 1 the locator 110 may determine the location and type of one or more conductive utility lines, such as the utility lines 130, 140, and/or 150, based on processing of the received keyed signals.

In typical implementations, the locator 110 and transmitter 120 may generally be of the type disclosed in the above-referenced incorporated patents and patent applications, and may include the hardware, housings, antennas, receiver circuits, processing elements, and other associated electronics to receive and process magnetic field locating signals. The additional interpretation functionality as described subsequently herein may be implemented in one or more processing elements of the locator, which may be included in or coupled to a decoding/interpretation module. As noted above, in various embodiments the keyed signal may be implemented using various signal keying schemes such as FSK, PSK, ASK (e.g., on-off keying or multi-amplitude ASK), and/or other types, variations, and/or combinations of modulations. Additional details of utility locator transmitters are described subsequently herein in conjunction with the transmitter system embodiment 1100 of FIG. 11 and the locator system embodiment 1200 of FIG. 12

In an exemplary embodiment two or more different utility lines may include different keyed signals coupled to them based an identified utility type or other utility designator (i.e., for multiple instances of the same utility type or to identify other conductors in the area that are not specifically utilities). For example, each utility line 130, 140, and 150 illustrated in FIG. 1 may have a different keyed signal generated in the transmitter coupled to it if they are of different utility types and/or are different instances of the same utility type. The transmitter may generate the keyed signals in one or more signal generation circuits such as shown in further detail in FIG. 12, described subsequently herein. In some embodiments the transmitter may have multiple signal generation circuits corresponding to the corresponding different number of current output signals. In other embodiments, a single signal generation circuit may generate multiple different output current signals having different keying. In some embodiments suites of output frequencies, such as are described in the incorporated applications, may be generated at the transmitter, with the suites applied separately to different utilities.

In the example system of FIG. 1, keyed signal 132 may be coupled to the utility line 130 (of a first type or designator), keyed signal 142 may be coupled to the utility line 140 (of a second type or designator), and keyed signal 152 may be coupled to the utility line 150 (of a third type of designator). Each keyed signal 132, 142, and 152 may be coupled to it respective utility line 130, 140, and 150 via one or more signal coupling devices connected to the transmitter device 120. For instance, clamp 160, clip 170, and/or induction stick device 180 are example signal coupling devices and may be referred to collective as part of a current coupling element or subsystem.

A transmitter 120 ground output may further be connect to a ground stake or clamp 185 providing a return path for current, particularly in the case where direct coupling via direct contact clamps are used. In further embodiments, other signal coupling devices may also be used to provide current signals to targeted utilities including, but not limited to, Q-rings or other Hi-Q induction devices as are known or developed in the art, other devices directly coupled to the utility or to other conductors, and the like (not shown).

Figure 12:
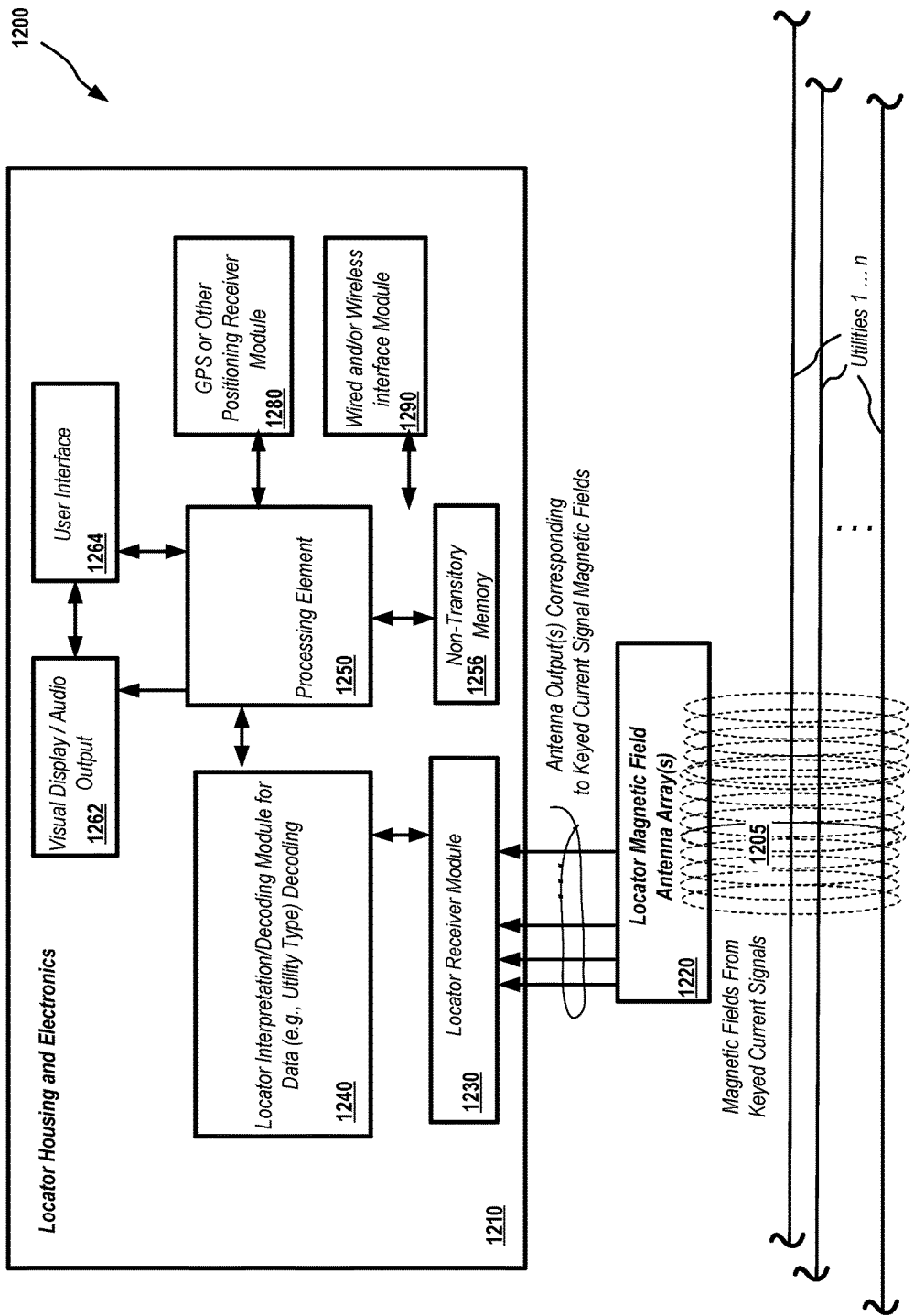
FIG. 12 illustrated details of one embodiment of a signal keyed utility locator system.

On each signal coupling device 160, 170, and 180 or between the signal coupling devices and the transmitter device 120 in FIG. 1, a utility designator device 190 may be included. Each utility designator device 190 may be used to provide a signal to a transmitter to encode a particular utility type or designator and/or other additional information onto its coupled utility line. For example, a utility designator may include a switch, dial, or button and associated electronic circuitry to send a signal with utility selector data to the transmitter as shown in FIG. 12. This utility designator signal may then be used by the transmitter to select a particular utility type to be encoded on the corresponding output current signal so that the locator can identify the utility type.

In some embodiments, the signal coupling devices and/or ground stake may include a sonde for generating a dipole magnetic field signal, which may include encoded data. This dipole magnetic field signal may be detected by the locator to determine the position of the signal coupling device and/or ground stake/clamp, as well as device type information (e.g., clamp or clip, utility designator, etc.) and store this information. The sonde signal may be a magnetic field signal corresponding to a selected utility type. For example, the data signal encoded/keyed on the sonde signal may correspond to or be the same as the encoded data in the output current signal. In some embodiments, the output current signal may be un-keyed (e.g., a continuation wave or CW signal) and only the sonde signal may be keyed so as to identify the utility type).

Additional details of utility locator and transmitter devices and circuits, coupling devices, utility selector/designator devices, and/or related system devices and methods thereof that may be used in embodiments in conjunction with the disclosures herein are described in the incorporated patents and patent applications.

Figure 2:
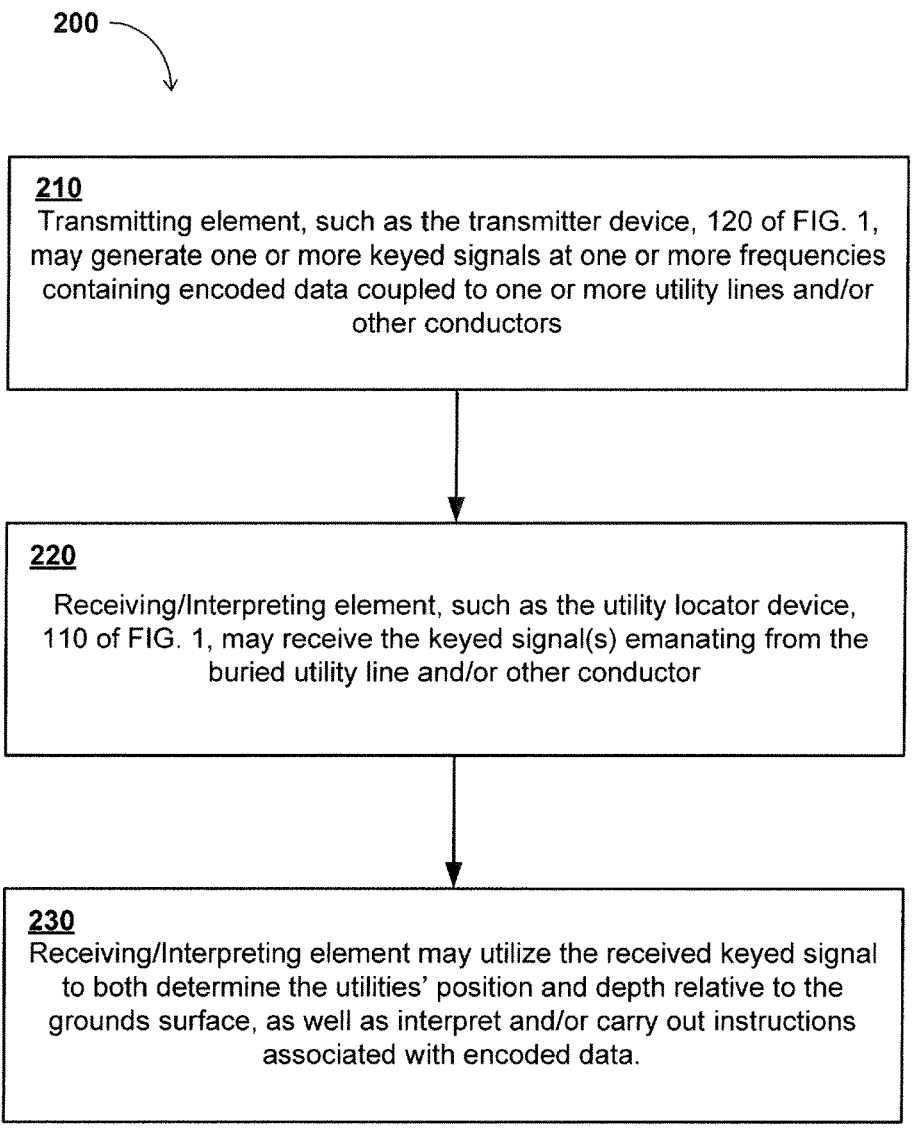
FIG. 2 is a flow chart illustrating one embodiment of a signal keying method for use in a signal keying utility locating system.

FIG. 2 illustrates details of a signal keyed utility locating method embodiment 200 in accordance with aspects of the present disclosure. Method 200 may include step 210, where a transmitting element, such as the transmitter 120 of FIG. 1, generates one or more keyed signals at one or more frequencies, with the keyed signals containing encoded data. The keyed signals may be signals of a suite of signals as described in the incorporated applications, and the suite may be selected so as to be unique to a particularly targeted utility or, in some embodiments, a single signal may be used for each utility. The utility type may be the type as indicated to the transmitter by a utility designator/selector device such as designators 190 as shown in FIG. 1. Via the couplers the current signals are coupled to one or more utility lines and/or other conductors. The keyed current signals flow in the utilities and generate corresponding magnetic fields that can be received and processed at an associated utility locator.

In step 220, the locator receives the magnetic field signals, processes them in a receiving element, and positional information about the utility as well as other information as may be determined in a locator may be generated and saved in a memory of the locator. This step may include moving the locator within proximity of the utility line or other conductor. In step 230, the receiving/interpreting element may likewise process the received keyed signal to determine both the utilities' position and depth relative to the ground's surface as well as the utility type and/or other encoded information. In some embodiments the receiver and interpreting/decoding elements may be in a single module or sub-system of the locator, whereas in other embodiments they may be separately implemented.

In some embodiments instructions may be provided from the transmitter to the locator in the keyed data. In these implementations, the locator may carry out any procedures associated with the provided instructions. The instructions, utility type information, and other data or information may be stored in a non-transitory memory of the locator, may be presented to a user on a visual and/or audible display or other output device, and may be transmitted from the locator via a wired or wireless data communications module in the locator (e.g., a Bluetooth, Wi-Fi, cellular, Ethernet, etc. module) to another communicatively coupled device or system.

In one exemplary embodiment the signal keying may be implemented as ASK signaling. However, the signal keying scheme implemented in example system 100 of FIG. 1 and example method 200 illustrated in FIG. 2 may, for example, be a frequency shift keying (FSK) scheme. An FSK scheme, such as FSK scheme 300 illustrated in FIG. 3 may modulate between two keying frequencies, such as keying frequencies 310 and 320. Each of the keying frequencies 310 and 320 may be selected as being spaced such that one keying frequency is higher and one is lower than a closely associated reference frequency 330. The locator may be tuned to the reference frequency and may have a bandwidth selected to include the two spaced-apart keying frequencies. For example, keying frequency 310 may be 1 Hz lower than the reference frequency 330 and keying frequency 320 may be 1 Hz higher than the reference frequency 330. The use of digital filtering techniques, such as discrete Fourier transforms (DFTs), may be applied to the received signal (including each keying frequency 310 and 320) at the receiving/interpreting element. Filtering of keying frequencies 310 and 320 may occur within a predetermined sample range, such as sample ranges 315 and 325, such that they may each be inclusive of the reference frequency 330 and exclusive of the other keying frequency to provide narrowband signal detection and processing.

In some embodiments, a utility locator device (such as those described in the aforementioned patents and patent applications) and/or other receiving/interpreting element may be tuned to receive signals based on a predetermined reference frequency or multiple signals based on multiple reference frequencies, which may be common frequencies used in utility locating systems known in the art. In such embodiments, a non-signal keying utility locator receiving a keyed signal from a transmitter that provides a signal keyed output current signal may still utilize the keyed signal to determine the utility's location and depth within the ground if the frequency difference (e.g., in an FSK implementation) is within the passband bandwidth of the utility locator device receiver and filters.

Figure 3:
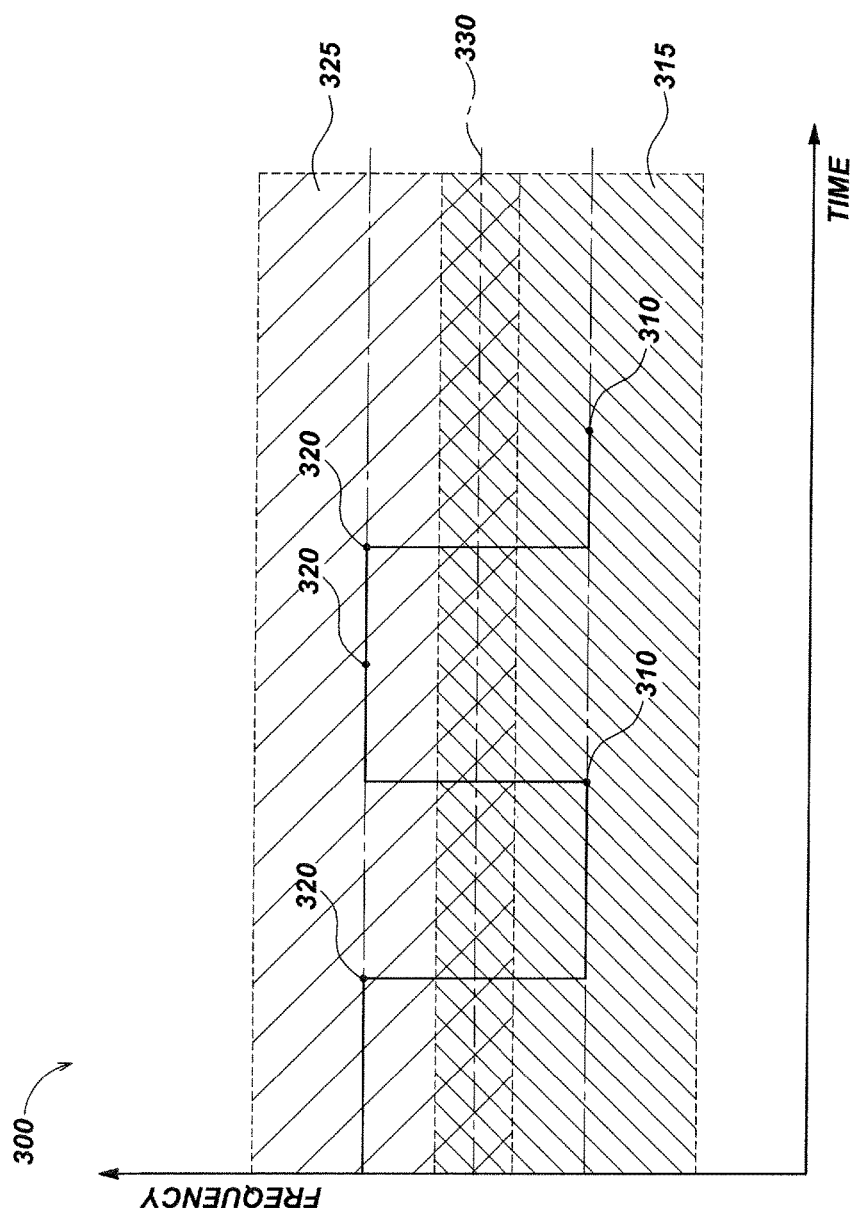
FIG. 3 is a diagram illustrating details of one embodiment of an FSK scheme for use in a signal keying utility locating system.
Figure 4:
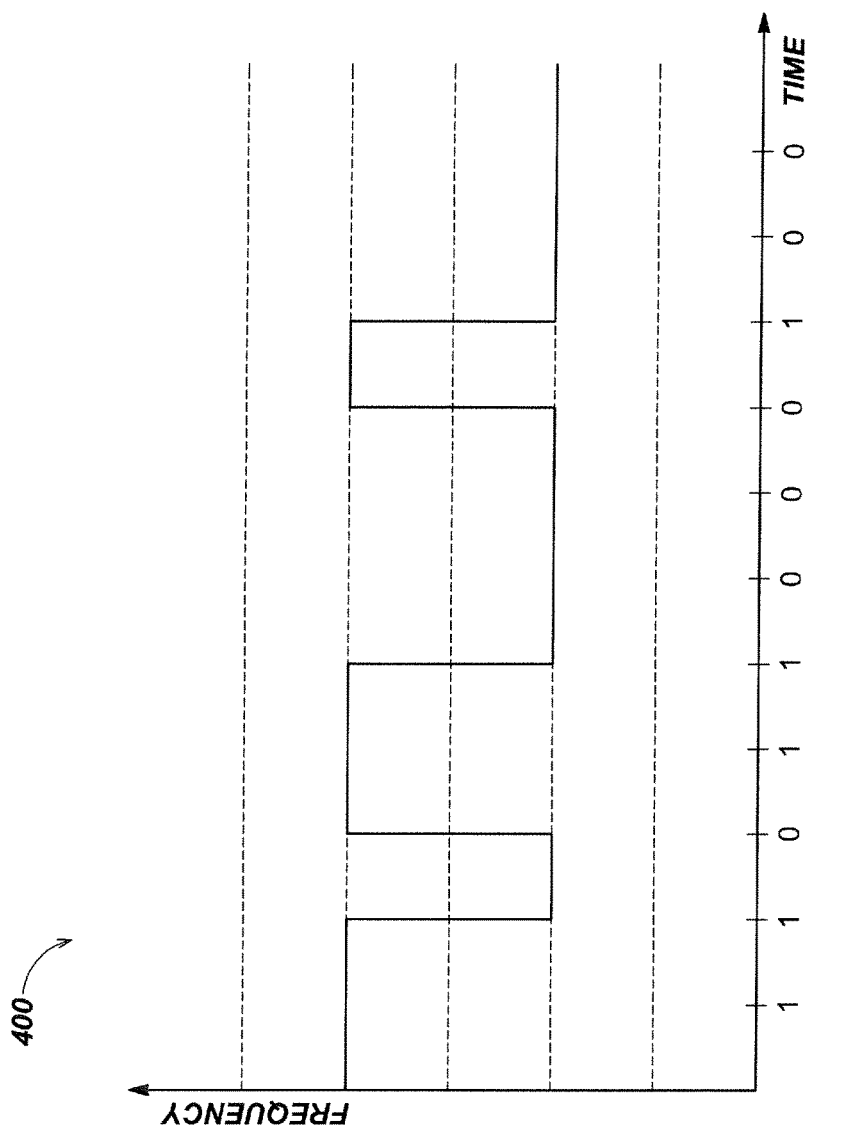
FIG. 4 is a diagram illustrating details of one embodiment of an asynchronous encoding scheme that may be used with keyed signals.

FIG. 3 illustrates details 300 of signaling in an FSK implementation. In this embodiment, signals may be locked to an absolute or known phase or time reference at both the transmitter and locator. For example, satellite navigation system receiver modules such as global positioning system (GPS) receivers, and/or other precise timing devices, included within or coupled to a signal keyed transmitter and locator may be used to provide a precision time reference. This may be used to lock signals to an absolute phase reference which may be based on a GPS or other precision time source derived clock. Locking of signals to an absolute phase reference may also be implemented via encoding data using non-return-to-zero (NRZ) or other asynchronous encoding schemes. An exemplary asynchronous encoding scheme 400 is illustrated in FIG. 4. In embodiments where keyed signals are locked to an absolute phase reference, current direction of the signal at the receiving/interpreting element may also be determined, such as is described in the incorporated applications.

Figure 5:
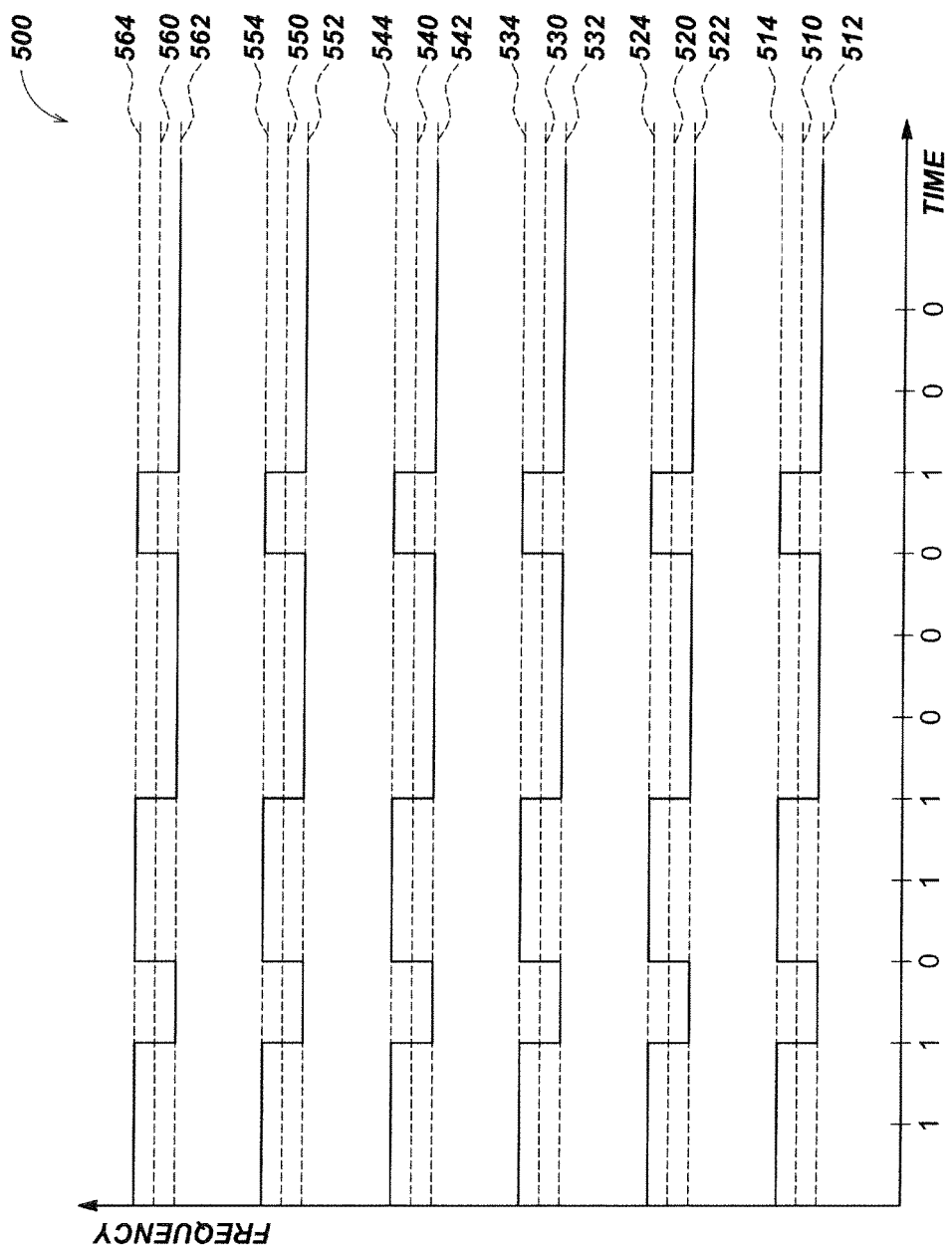
FIG. 5 is a diagram illustrating details of one embodiment of a keying scheme using multiple simultaneous reference frequencies.

Transmitter device and method embodiments may provide a keyed output current signal based on one reference frequency or multiple reference frequencies simultaneously. For example, the keyed signal(s) provided by the transmitter 120 of FIG. 1 may include multiple keyed signals around different, spaced apart reference frequencies, with all provided simultaneously. Details of signaling in an example embodiment are illustrated in FIG. 5, where the keyed output current signal 500 is based on multiple reference frequencies 510, 520, 530, 540, 550, and 560 that are provided at the same time.

Some of the reference frequencies 510-560 may be based on commonly used frequencies known in the utility location art. This may be used to facilitate reverse-compatibility between signal-keyed transmitters and non-signal-keying compatible locators. In some embodiments, non-signal keying utility locators and/or other receiving elements that are used with keyed transmitters and receive a corresponding keyed signal may still use the keyed signal to determine the utilities' location and depth within the ground if the signal frequencies and filters in the locator are set accordingly. For example, reference frequency 510 may be at 32 Hz, reference frequency 520 may be at 738 Hz, reference frequency 530 may be at 8,778 Hz, reference frequency 540 may be at 61,938 Hz, reference frequency 550 may be at 179,898 Hz, and reference frequency 560 may be at 486,938 Hz. Appropriate filtering in the locator will facilitate backward-compatible operation.

Keying of signals may occur at each frequency simultaneously such that common encoding of signals received by a utility locator are received and processed simultaneously. For example, the keying of each reference frequency 510-560 may be done with FSK modulation wherein a set of keying frequencies corresponding to each reference frequency are spaced one lower and one higher than its corresponding reference frequency. For example, each reference frequency may have a lower keying frequency 1 Hz below its reference frequency and a higher keying frequency 1 Hz higher than its reference frequency. Within keyed signal 500 of FIG. 5, keying frequencies corresponding to each reference frequency may be such that: reference frequency 510 may correspond to keying frequencies 512 and 514; reference frequency 520 may correspond to keying frequencies 522 and 524; reference frequency 530 may correspond to keying frequencies 532 and 534; reference frequency 540 may correspond to keying frequencies 542 and 544; reference frequency 550 may correspond to keying frequencies 552 and 554; and reference frequency 560 may correspond to keying frequencies 562 and 564. In another embodiment, any number of reference frequencies may be used. In other embodiments, a different keyed signal encoding different information may be used at each reference frequency.

Figure 6:
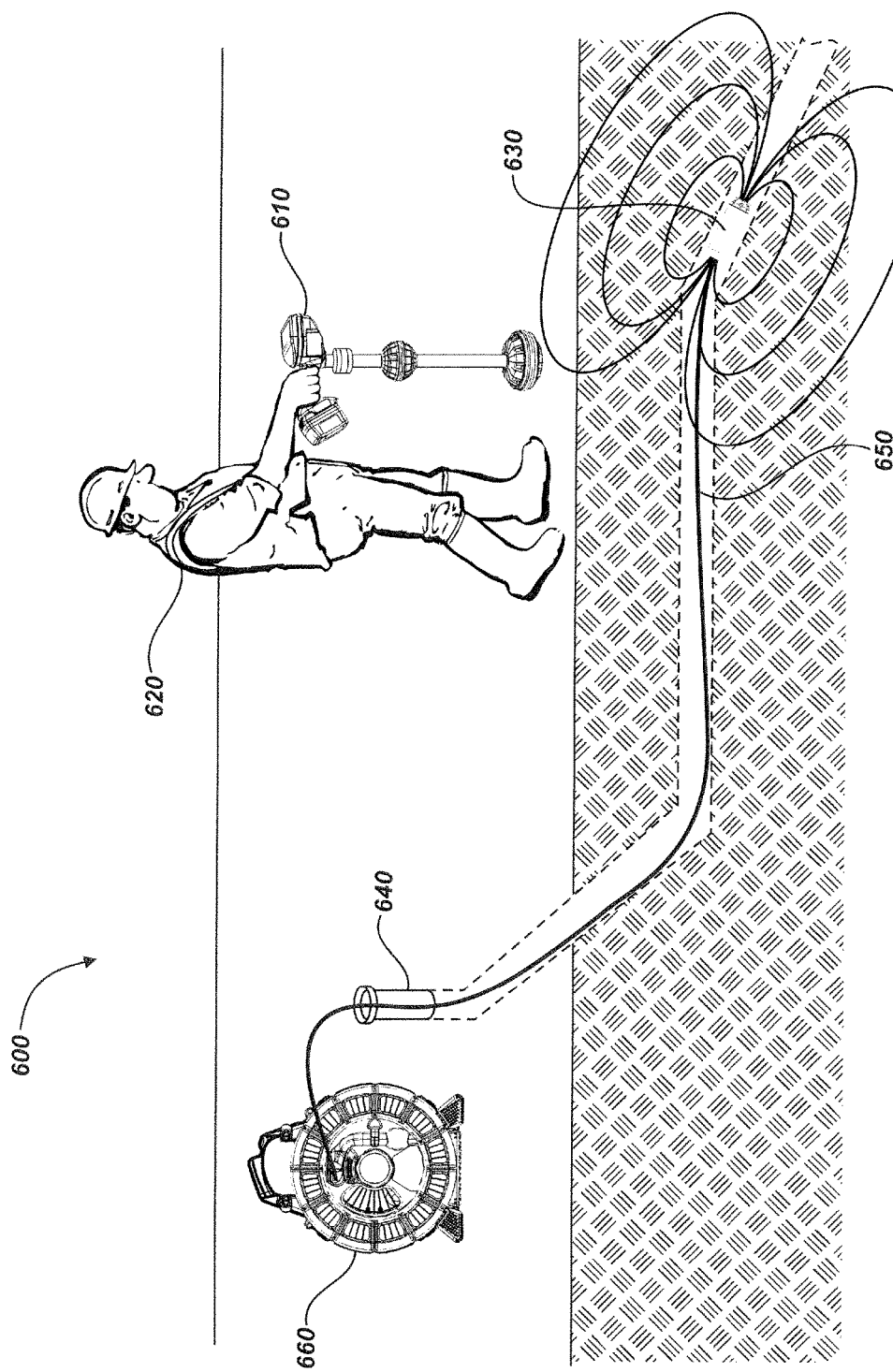
FIG. 6 is an illustration of details of one embodiment of a signal keying utility locating system with a pipe sonde.

In some signal keying utility locating system, device, and method embodiments, keyed signals may not necessarily be coupled specifically to a utility line or other conductor. For example, signal keying utility locating system embodiment 600 as illustrated in FIG. 6 may include a utility locator 610 as carried by a user 620. Locator 610 may be configured to receive keyed signals (i.e., to receive and process magnetic field signals to determine utility location, depth, current, etc., along with receiving data encoded in the magnetic field signals such as utility type or other encoded data). The received signals may, for example, be an FSK signal and/or other keyed signal using a signal keying scheme such as described herein. The signal may be transmitted by a sonde device (i.e., a magnetic-field dipole signal generator), such as pipe sonde 630, which may be inserted within a pipe 640 and/or other conduit/void.

The pipe sonde 630 may be secured about the distal end of push-cable 650 and fed into the pipe manually or via a powered push-cable deployment device. The proximal end of push-cable 650 may connect to a cable reel 660 for storing, deploying, and retracting the push-cable 650 to force the push-cable 650 and connected pipe sonde 630 within the pipe 640 and/or other conduit/void and retrieve it when the locate/inspection operation is completed. The pipe sonde 630 may be powered by an internal battery and may include circuitry to generate and transmit an FSK or other keyed signal. The keyed signal may be received and processed by the utility locator device 610 and/or other receiving element.

In other embodiments, power and circuitry to control and generate a keyed signal may fully or partially be disposed within one or more other connected devices such as a cable reel and/or camera control unit (CCU), not illustrated, and may be transmitted/communicated to the pipe sonde. Further system embodiments may other connected devices. For example, a system may include a pipe inspection camera and a CCU and/or other viewing/control device for viewing/inspecting and controlling the pipe inspection camera within a pipe and/or other conduit/void. In some such embodiments, a signal keying pipe sonde for encoding data into the sonde magnetic field signal may be included within or coupled at or near the pipe inspection camera for determining location of a particular view within the pipe based on location information of the sonde done by the locator. The CCU and/or cable reel, may be configured to communicate with other wired or wirelessly connected devices/systems using corresponding wired or wireless communication modules incorporated in or coupled to them. For example, the CCU and/or cable reel may communicate captured images, video, audio, and/or other inspection data to smart phones, tablets and/or laptop computers, base stations, and/or other computing devices. Such communications may include the use of Bluetooth, ISM radio, WLAN, and/or other wireless or wired communication apparatus and processes. Such communications may further include the use of FSK and/or other signal keying schemes.

Within the signal keying utility locating system 600 of FIG. 6, the pipe sonde 630 may include various internal sensors. Example sensors include gyroscopic sensors, compass, and/or accelerometers to determine tilt and orientation of pipe sonde 630 within pipe 640. Such orientation information may further be used to more accurately determine the location of pipe sonde 630 at the utility locator device 610.

Figure 7:
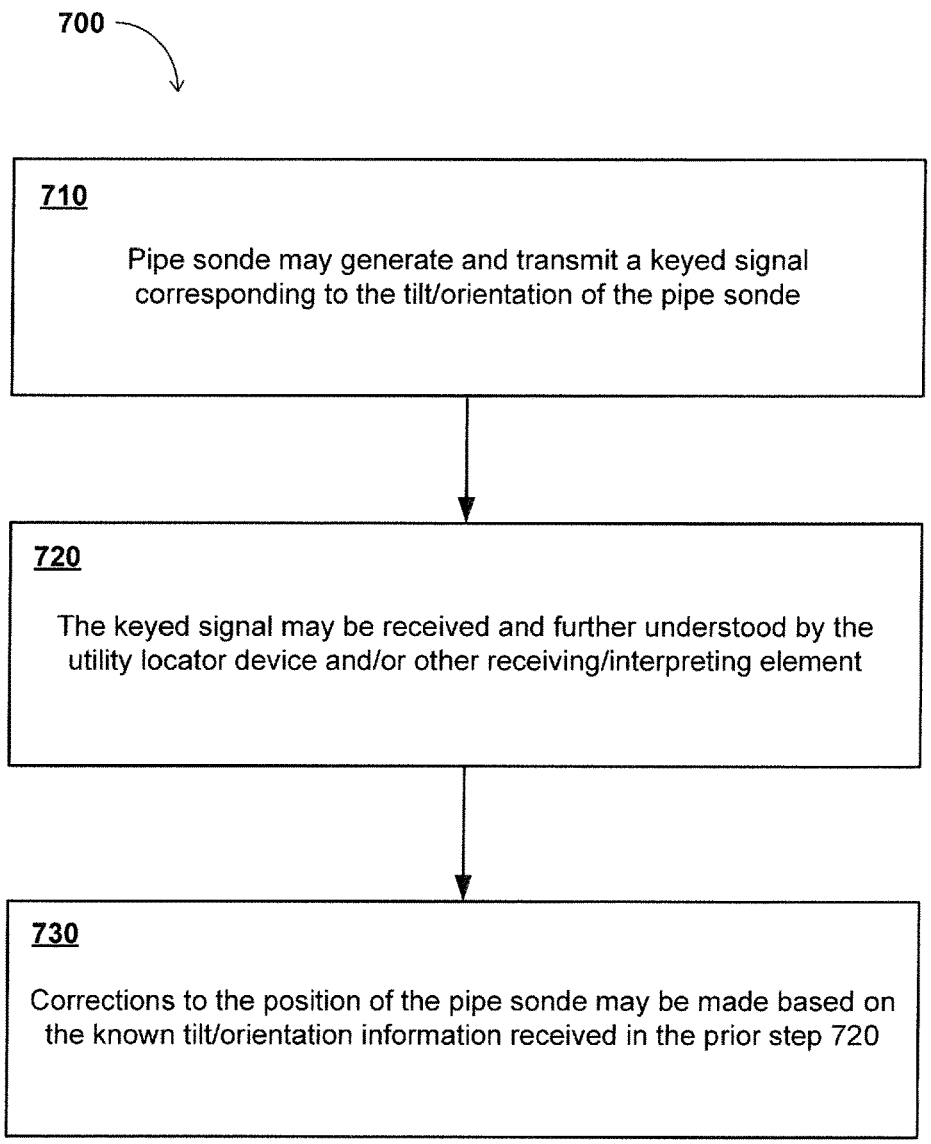
FIG. 7 is a flow chart illustrating details of one embodiment of tilt/orientation being communicated via keyed signal to determine location information of the pipe sonde.

As illustrated in the embodiment of FIG. 7, a signal keying pipe sonde locating method 700 may include step 710 where a pipe sonde may generate and transmit a keyed signal corresponding to the tilt/orientation of the pipe sonde. In step 720, the keyed signal may be received and processed by the utility locator and/or other receiving/interpreting element to extract/decode the tilt/orientation data from the keyed signal. In step 730, corrections to the position of the pipe sonde may be made determined based on the known tilt/orientation information received in the prior step 720 by correcting the locate information in the locator to compensate for the tilt/orientation.

In other embodiments, the keyed signal generated and transmitted by a pipe sonde may include other information/data in lieu of or in addition to tilt/orientation data. For example, a serial number and/or other identification number of the pipe sonde device may be transmitted for identification purposes. Additional details of pipe sonde devices and/or related system devices that may be used in embodiments in conjunction with the disclosures herein are described in the incorporated applications.

Figure 8:
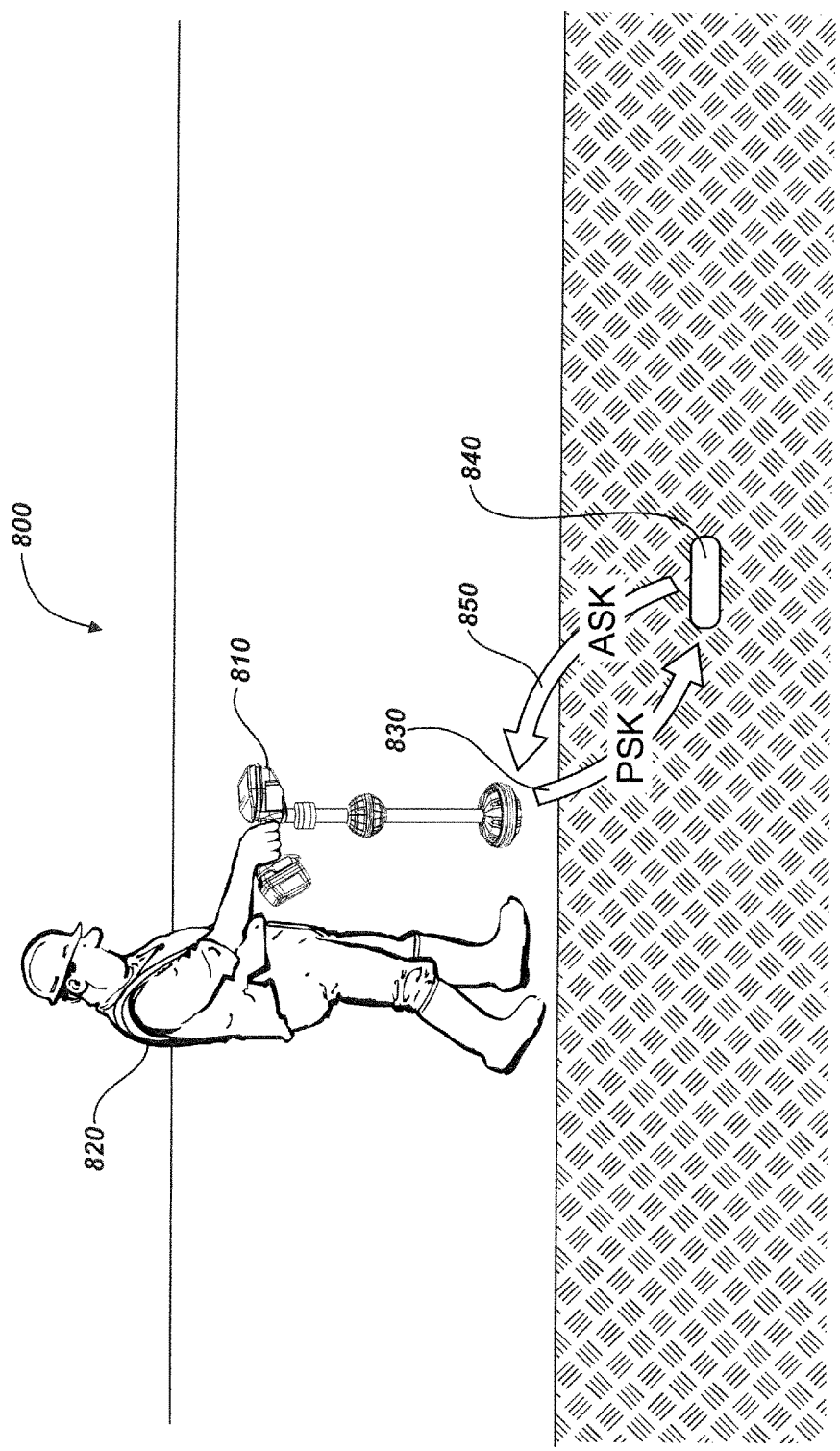
FIG. 8 is an illustration of details of one embodiment of a signal keying utility locating system with an electromagnetic marker device.

In some signal keying utility locating systems, devices, some system devices may be configured as both transmitting element and receiving/interpreting element. For example, as illustrated in FIG. 8, a signal keying utility locating system embodiment 800 may include a utility locator device 810 held by a user 820. The utility locator device 810 may be configured as both a transmitting element and receiving/interpreting element. The utility locator device 810 may generate and transmit a signal 830 further received by an electromagnetic marker device 840. Additional details of electromagnetic marker devices such as marker device 840 that may be used in embodiments in conjunction with the disclosures herein are described in the incorporated applications including, for example, U.S. patent application Ser. No. 14/516,558. Electronic marker device 840 may also be both transmitting element and receiving/interpreting element so that it may receive signal 830 and generate/transmit a new signal 850, which may further be received and decoded/interpreted by the utility locator device 810. Both signal 830 and 850 may be keyed signals that transmit various information between system devices. The keyed signals of system devices that are both transmitting element and receiving/interpreting element, such as signals 830 and 850, need not use the same signal keying scheme. For example, signal 830 from utility locator 810 may be encoded using a phase shift keying (PSK) scheme whereas the signal 850 from the electromagnetic marker device 840 may be encoded using an ASK or FSK scheme.

Figure 9:
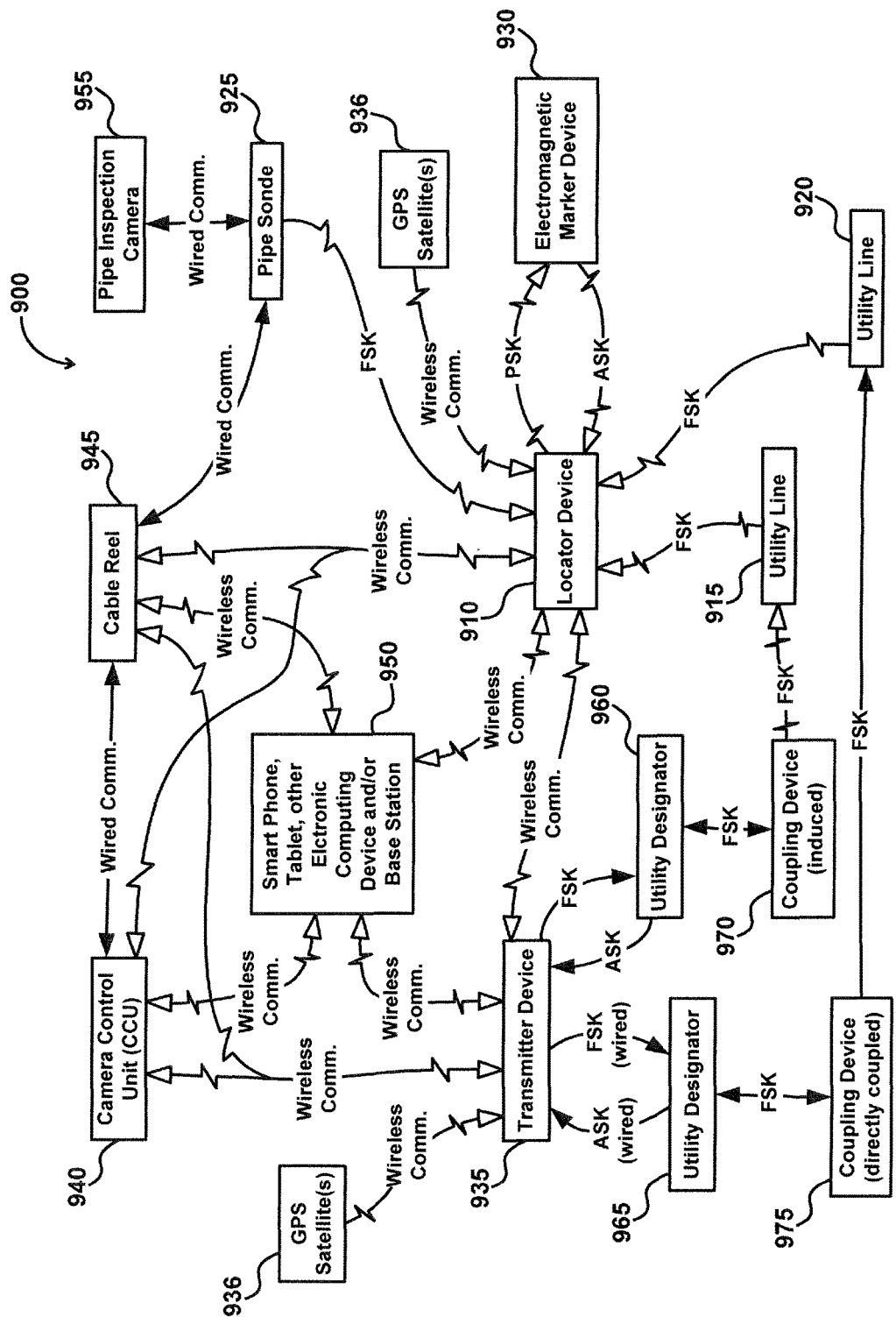
FIG. 9 is a diagram showing details of one embodiment of communication within an exemplary signal keying utility locating system.

In other system embodiments, other devices, keying schemes, and/or methods may be used. Examples of other devices, keying schemes, and other methods for communication between devices are illustrated in diagram 900 of FIG. 9, showing other utility locating system embodiment details. System 900 may include various devices for transmitting and/or receiving/interpreting/decoding keyed signals using different keying and/or other communication schemes. For example, system 900 may include a utility locator 910 for receiving/interpreting FSK keyed magnetic field signals from utility lines 915 and 920, transmit PSK encoded signals to an electromagnetic marker device 930, and receive and interpret/decode a returned ASK encoded signal from the same marker device 930.

Still referring to FIG. 9, some system devices, such as utility locator device 910 and transmitter device 935 may be configured to receive signals from global navigation satellite systems, such as global positioning system (GPS) satellites 936 using a GPS receiver module (or other satellite or terrestrial based positional navigation or timing system signal receiver modules). Signals received from GPS satellites 936 at both utility locator device 910 and transmitter device 935 may be used to determine geographical location of receiving devices as well as lock keyed signals, such as FSK signals from utility lines 915 and 920, to an absolute phase or timing reference. Locking of keyed signals to an absolute phase reference may further be implemented in some system devices via encoding data using non-return-to-zero or other asynchronous encoding schemes as described previously herein. In systems such as system 900, where keyed signals are locked to an absolute phase reference, current direction of the signal on a utility line, such as utility lines 915 and 920, and/or other received keyed signal may be determined such as described in the incorporated applications.

The utility locator 910 may further be configured to communicate information with other system devices through wireless communication protocols, including, but not limited to; Bluetooth, Wi-Fi or other wireless local area network (WLAN) technologies, industrial, scientific and medical (ISM) radio bands, cellular data bands, and/or others including other wireless standard protocols that may or may not use signal keying such as FSK, PSK, and/or ASK. Corresponding receiver/transceiver modules may be included in the locator to implement wired and/or wireless communication with other devices.

The other wireless communication protocols may be referred to hereafter as 'other wireless communication(s)' and are indicated in FIG. 9 as 'wireless comm.' For example, utility locator device 910, configured to interpret keyed signals, may receive keyed signals from various devices/locations within the utility locating operation, such as FSK keyed signals to utility lines 915 and 920, FSK keyed signal from pipe sonde 925, ASK keyed signal from an electromagnetic marker device 930.

The utility locator 910 may further be configured as a transmitting element, generating and transmitting a PSK keyed or other keyed signal to electromagnetic marker device 930. Such keyed signals may be used to communicate various information, such as device identification, utility type, tilt of pipe sonde 925, and/or other data or information. Other wireless communication may further be established between utility locator device 910 and other system devices, such as, transmitter device 935, a camera control unit (CCU) 940 and/or cable reel 945, and/or smart phone, tablet, or other computing device and/or base station 950.

These other communications may include various locate/device information for instance, geographic or relative location of devices and/or keyed or other signals, other mapping data, information communicated by keyed signals, and/or other locate operation information. Other wireless communications may be established between various system devices with the utility locator device 910. For instance, other wireless communications may occur between the transmitter device 935 and computing devices/base station 950 and/or CCU 940 and/or cable reel 950. Furthermore, other wireless communications may be established between the CCU 940 and/or cable reel 945 and/or the computing devices/base station 950.

In system 900 of FIG. 9, some devices may further include a wired connection between devices for communicating information various wired communication protocols and standards, such as via serial communication links, Ethernet, parallel wired communications links, and the like. Such wired communications are illustrated in FIG. 9 with solid arrowheads and labeled 'wired comm.'. For example, CCU 940 may connect to cable reel 945, pipe sonde 925, and a pipe inspection camera 955 via wired connections to communicate information between these devices.

As another example, wired connections may be included between transmitter device 935 and utility designators 960 and 965. In this example, signal keying may occur over such a wired connection. The transmitter device 935 may generate and transmit an FSK signal to each utility designator 960 and 965. The FSK keyed signal to each utility designator 960 and 965 may encode different information to each utility designator 960 and 965. Each utility designator 960 and 965 may further respond with an ASK keyed signal, which may be unique to each, to the transmitter device 935 via wired connection. Each utility designator 960 and 965 may further communicate an FSK keyed signal to an associated coupling device 970 and 975 via wired connection thereto. Each FSK signal communicated from each coupling device 970 and 975 may further be coupled to a corresponding utility line 915 or 920.

In some embodiments, a phase balanced signal keying scheme may be used to communicate information through modulation of frequencies while generating a signal or signals with an average phase as defined by the reference phase. The phase balanced signal keying schemes, as described herein, may be used to allow system devices to maintain a phase reference with signal(s) broadcasted by the transmitter device. An exemplary phase balanced signal keying scheme is illustrated in diagram 1000 of FIG. 10A. The diagram 1050 of FIG. 10B illustrates measure of phase corresponding to the modulation of frequencies within diagram 1000 of FIG. 10A.

Figure 10A:
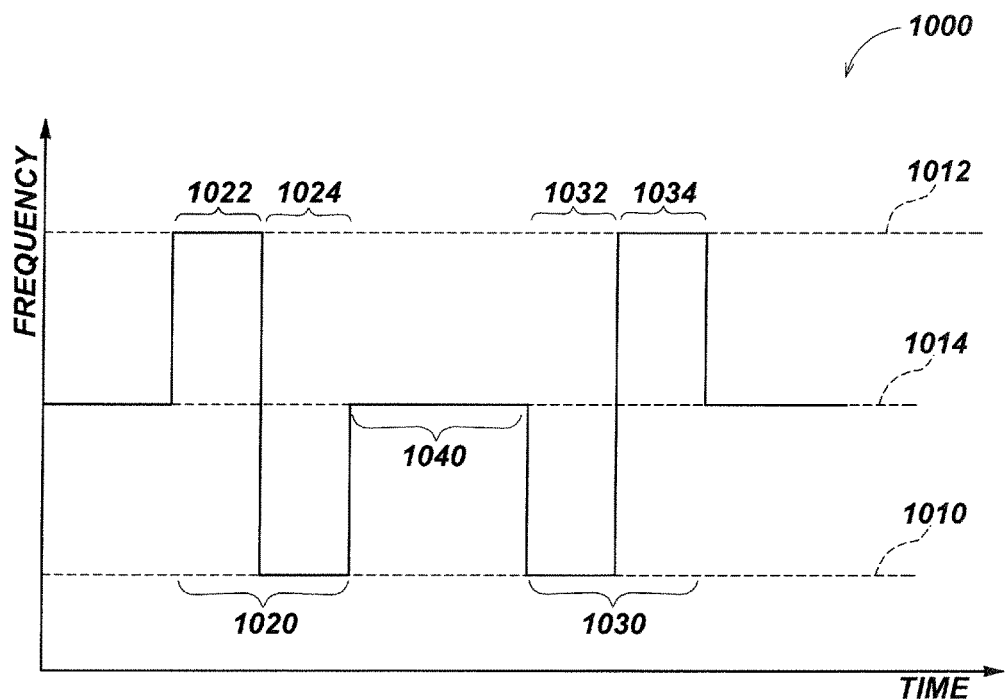
FIG. 10A is a diagram illustrating details of one embodiment of a phase balanced signal keying scheme.
Figure 10B:
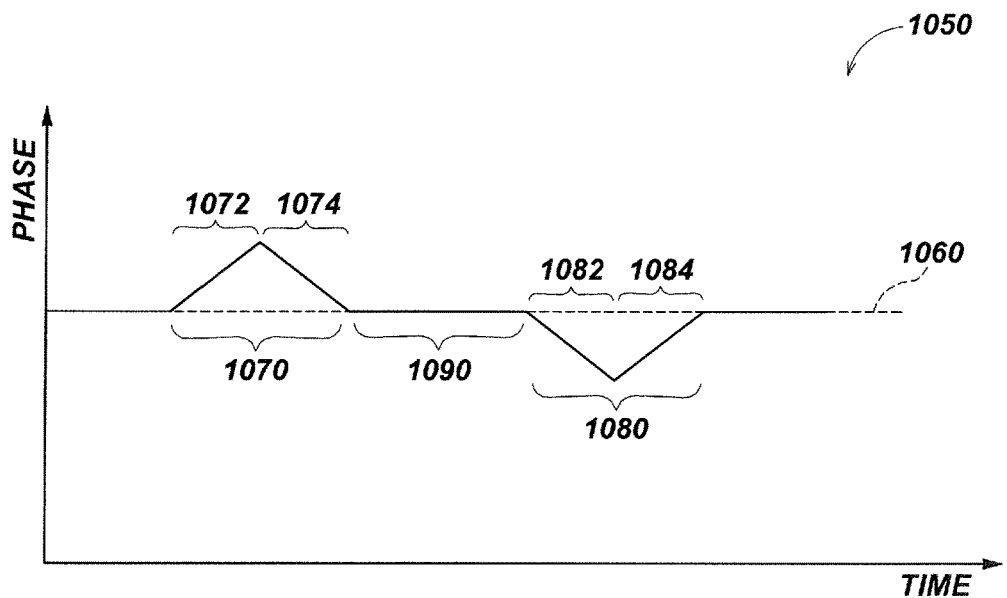
FIG. 10B is a diagram illustrating details of one embodiment of phase measurement associated with the phase balanced signal keying scheme of FIG. 10A.

Referring to FIG. 10A, details of a phase balanced signal keying embodiment are illustrated. As shown in diagram 1000, signaling may include two keying frequencies, such as keying frequencies 1010 and 1012. Each of the keying frequencies 1010 and 1012 may be selected as being spaced-apart such that one keying frequency is higher and one is lower than an associated reference frequency 1014. For example, keying frequency 1010 may be 1 Hz lower than the reference frequency 1014 and keying frequency 1012 may be 1 Hz higher than the reference frequency 1014. The reference frequency 1014 of FIG. 10A may be generated based on reference phase 1060 illustrated in FIG. 10B. In some embodiments, keying frequencies may be spaced at other and/or different spacings from a reference frequency. Timing by which each keying frequency, such as with keying frequencies 1010 and 1012, are sent may be set such that a phase shift occurring with one keying frequency may be balanced out with a phase shift from the other keying frequency in the opposite direction. The overall phase during the interval of keying frequencies modulation may be set to combine such that the average phase corresponds to the phase of the reference frequency.

Still referring to FIG. 10A, a data bit 1020 may be comprised of multiple keying frequency intervals, such as keying frequency intervals 1022 and 1024, wherein modulation between keying frequencies 1010 and 1012 may be implemented. During each keying frequency interval 1022 and 1024, one of the keying frequencies 1010 or 1012 may be sent. The time interval of data bit 1020 of FIG. 10A may correspond to the time interval of balanced phase shift 1070 as illustrated in FIG. 10B. Similarly, keying frequency interval 1022 and 1024 may correspond to phase shifts 1072 and 1074 accordingly.

As illustrated in FIG. 10A, data bit 1020 may include the first keying frequency interval 1022, where the higher keying frequency 1012 is sent for a time period, followed by keying frequency interval 1024 where the lower keying frequency 1010 is sent. The frequencies and timing by which each frequency is sent within data bit 1020 may be set such that phase shifts average out to that of the reference frequency 1014. For example, sending the higher keying frequency 1012 during keying frequency interval 1022 may correlate to phase shift 1072 illustrated in FIG. 10B. Similarly, sending the lower keying frequency 1010 during keying frequency interval 1024 may correlate to phase shift 1074 (FIG. 10B) in the opposite direction and equal in magnitude to that of the phase shift 1072 (FIG. 10B) occurring during the first keying frequency interval 1022.

The data bit 1020 may represent a single bit of data. A different bit may be generated through a separate data bit interval, such as data bit 1030 of FIG. 10A, having a different pattern, timing, and/or use of frequencies than data bit 1020. Data bit 1030 may be sent on frequencies in a reverse order to that of the data bit 1020. For example, data bit 1030 may include the first keying frequency interval 1032 sending the lower keying frequency 1010 for a time period followed by keying frequency interval 1034 sending the higher keying frequency 1012. The frequencies and timing by which each frequency is broadcast within data bit 1030 may be set such that phase shifts average out to that of the reference frequency 1014. For example, sending of the lower keying frequency 1010 during keying frequency interval 1032 may correlate to phase shift 1082 of balance phase shift 1080 illustrated in FIG. 10B. Similarly, sending of the higher keying frequency 1012 during keying frequency interval 1034 may correlate to phase shift 1084 (FIG. 10B) in the opposite direction and equal in magnitude to that of the phase shift 1082 (FIG. 10B) occurring during the first keying frequency interval 1032.

Between each data bit 1020 and 1030, a reference frequency interval 1040 may include the reference frequency 1014 for a period of time where no modulation of frequencies occurs, and the reference frequency may be sent. The reference frequency interval 1040 of FIG. 10A may correspond to the phase interval 1090 of FIG. 10B. A reference frequency, such as the reference frequency interval 1040 in FIG. 10A, may further aid in averaging phase of frequencies to correlate to that of the reference frequency 1014.

FIG. 11 illustrates details of an exemplary embodiment 1100 of a signal keyed utility locator transmitter system including a transmitter 1110 and a coupling subsystem 1140. Transmitter 1110 includes a user interface/control module 1112 with user interface controls for receiving user input for setting transmitter parameters and operating the transmitter device. These may be, for example, touch-screen controls, switches, buttons, wired or wireless interfaces, and/or other elements for receiving user input. Transmitter 1114 also includes one or more processing elements 1114 for controlling operation of the transmitter and communicating with other transmitter elements such as signal generation and data encoding module 1116, output current signal generator/amplifier 1118, and other transmitter elements (not explicitly shown in FIG. 11). Signal generation and data encoding module 1116 includes electronic circuitry to generate output signals at one or more frequencies and for encoding data onto the signals using keying methods as described herein such as ASK, FSK, and the like. The keying may include utility type data as well as other data or information associated with the transmitter operation and/or system data. Utility type information may be provided to module 1116 via a wired or wireless connection to the coupling element 1140, such as from one or more utility designator selector switches. Utility type may also be provided from a user, such as via the user interface module 1112. Output current signal generator/amplifier module 1118 generates one or more output current signals based on the encoded signaling provided from the signal generation module 1116, with the outputs being at current levels usable for coupling directly or inductively to one or more utilities. Utility coupling element 1140 includes connectors and cables for coupling the keyed output current signals from the transmitter 1110 to the corresponding utilities, via direct or inductive couplers. Associated utility designators may be included to allow a user to select a utility type at the point of connection, such as via a dial or button on the designator, and provide information about the selected utility type to the transmitter signal generation module 1116.

In some embodiments, the utility locator designators and/or ground stake or clamp, such as ground clamp 1142 as shown, may include dipole magnetic field sondes which may include encoded data in the sonde signals. This may be used, for example, to identify the position of the selector or ground clamp/stake with an associated utility locator so that the position of the designator or stake may be stored in a memory of the locator in conjunction with other information obtained during a locate. This stored information may be useful later if maps or other databases of information about the locate are generated. For example, a map of a locate process may include a representation of where the transmitter output currents were coupled to the utility and/or where the ground stake was coupled to the ground or other grounding objects. The representation may be an icon or other marker on a map, with the icon or other marker generated based on the sonde data as sensed by the locator.

FIG. 11 illustrates details of an exemplary embodiment 1200 of a signal keyed utility locator device 1200. Locator 1200 includes a locator housing with internal electronics 1210, along with an incorporated or coupled antenna array or arrays 1220. In operation, keyed magnetic field signals 1205 emitted from one or more utilities are received at the locator antenna array(s) 1220. The antenna arrays may be of the type described in the various incorporated applications. Output signals from the antenna arrays are provided to a receiver element 1230 of the locator, which may, in conjunction with interpreter/decoding module 1240, determine utility information for one or more utilities such as position, depth, current, and the like. In addition, decoding module 1240 further includes a data demodulator to extract the encoded data from the received signals (e.g., an ASK digital data receiver for ASK modulation, an FSK receiver for FSK, etc.). The received data may include utility type data. The utility type data and other locator data may be associated and stored in a memory of the locator, such as in memory 1256. A processing element 1250 may be used to control overall locator operation and/or may be used to implement receiving, demodulation, decoding, and/or other signal processing in the locator. The locator may be controlled through a user interface module 1264, such as a touch screen display, switches, buttons, or other user interface elements or connectors. Output, such as a visual display and/or audible output, may be provided from output module 1264. For example, the output may include a display of the locator-determined utility position and depth along with a visual indication of the corresponding type of utility based on the received utility type data encoded in the keyed signal. Additional modules in the locator may include a GPS or other positioning system module 1280, which may be used to determine the locator's absolute or relative position and store this information in association with the utility type information and locator information. A wired or wireless interface module 1290, which may be a WiFi, Bluetooth, cellular, Ethernet, or other wired or wireless data communications module may be included in the locator to send and/or receive information from other system devices.

In some configurations, the apparatus and systems described herein may include means for implementing features or providing functions described herein. In one aspect, the aforementioned means may be a module including a processor or processors in one or more processing elements, associated non-transitory memory and/or other electronics in which embodiments of the invention reside, such as to implement utility locator transmitter functions, utility locator functions, magnetic dipole sondes, induction sticks, utility designators/selectors, digital data encoding and decoding modules, image and/or video signal processing, and/or providing other electronic functions described herein. These may be, for example, modules or apparatus residing in transmitters, locators, CCUs, sondes, or other locate system devices.

In one or more exemplary embodiments, the electronic functions, methods and processes described herein and associated with utility locator transmitters, locators, utility type designators, sondes, CCUs, camera heads, and the like may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to locators, transmitters, sondes, utility designators, CCUs, camera heads, and other system devices may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two, which may be implemented in one or more processing elements. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but are to be accorded the full scope consistent with the disclosure herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended Claims and their equivalents.

We claim:

1. A transmitter system for use with a buried utility locator, comprising:
   a utility locator transmitter including:
   a signal generation module and data encoding module for generating ones of a plurality of different keyed signals, wherein the keyed signals include data defining a utility type or designator;

an output current signal generator module for receiving the plurality of different keyed signals and generating one or more current output signals for coupling to a buried utility; and a utility current coupling element comprising a utility designator, the utility current coupling element operatively coupled to the utility locator transmitter for providing a signal to the signal generation module representing a utility type or designator on which the current output signal from the transmitter is coupled to.

2. The transmitter system of claim 1, wherein the utility current coupling element includes a direct contact clip and the utility designator is operatively coupled to the direct contact clip.

3. The transmitter system of claim 1, wherein the utility current coupling element includes an induction stick and the utility designator is operatively coupled to the induction stick.

4. A transmitter system for use with a buried utility locator, comprising:

a utility locator transmitter including:

a signal generation module and data encoding module for generating ones of a plurality of different keyed signals, wherein the keyed signals include data defining a utility type or designator; and an output current signal generator module for receiving the plurality of different keyed signals and generating one or more current output signals for coupling to a buried utility;

wherein a signal is provided to the signal generation module representing a utility type based on a user input to a user interface/control module of the transmitter.

5. A transmitter system for use with a buried utility locator, comprising:

a utility locator transmitter including:

a signal generation module and data encoding module for generating ones of a plurality of different keyed signals, wherein the keyed signals include data defining a utility type or designator;

an output current signal generator module for receiving the plurality of different keyed signals and generating one or more current output signals for coupling to a buried utility; and a magnetic field dipole data sonde, wherein a magnetic field signal provided from the data sonde includes data representing one or both of a ground stake or clamp and a utility designator.

6. The transmitter system of claim 5, wherein the utility designator data further includes data representing a utility type defined by the utility designator.

7. A utility locator, comprising:

a locator housing;

a magnetic field antenna array for receiving a keyed magnetic field signal;

a locator receiver module coupled to an output of the magnetic field antenna array for determining locate information associated with one or more buried utilities based on the keyed magnetic field signal received at the magnetic field antenna array;

an interpretation/decoding module to decode a utility type associated with the keying imposed on the magnetic field signal received at the magnetic field antenna array; and a processing element and non-transitory memory for associating the locate information and the utility type data and storing the associated locate information and utility type data in the non-transitory memory.

8. The utility locator of claim 7, wherein the keyed magnetic field signal is ASK keyed.

9. The utility locator of claim 7, wherein the keyed magnetic field signal is FSK keyed.

10. The utility locator of claim 7, wherein the interpretation/decoding module further decodes a received keyed magnetic field sonde signal provided from a utility designator or a ground stake or clamp and associates locate data of the utility designator or ground stake location with the decoded keyed magnetic field sonde signal and stores the associated data in a non-transitory memory of the locator.

11. A utility locating system using keyed magnetic field signaling, comprising:

a transmitter sub-system comprising:

a utility locator transmitter including:

a signal generation module and data encoding module for generating ones of a plurality of different keyed signals, wherein the keyed signals include data defining a utility type or designator; and an output current signal generator module for receiving the plurality of different keyed signals and generating one or more current output signals for coupling to a buried utility; and a locator sub-system, comprising:

a locator housing;

a magnetic field antenna array for receiving the one or more keyed magnetic field signals provided from the transmitter;

a locator receiver module coupled to an output of the magnetic field antenna array for determining locate information associated with one or more buried utilities based on the one or more keyed magnetic field signals received at the magnetic field antenna array, where the keyed magnetic field signals are is-generated by flow of one or more of the current output signals in the buried utility;

an interpretation/decoding module to decode a utility type associated with the keying imposed on the magnetic field signal received at the magnetic field antenna array; and a processing element and non-transitory memory for associating the locate information and the utility type data and storing the associated locate information and utility type data in the non-transitory memory.

12. The system of claim 11, wherein the locator sub-system includes a visual display device, and the locate information and the utility type information are provided on the visual display.

13. The system of claim 11, wherein the signal generation module generates a plurality of data encoded signals with the keying of ones of the plurality of output signals uniquely representing two or more different utility types or designators.

14. The system of claim 13, wherein ones of the plurality of output current signals are provided based on corresponding to ones of the plurality of data encoded signals.

15. The system of claim 11, wherein the keyed signals are amplitude shift keying (ASK) signals.

16. The transmitter system of claim 11, wherein the keyed signals are frequency shift keying (FSK) signals.

17. A method of locating buried utilities and identifying utility types, comprising:

generating, in a utility locator transmitter, ones of a plurality of different keyed signals, wherein the keyed signals include data defining a utility type or designator; and receiving, in the utility locator transmitter, the plurality of different keyed signals;

generating one or more current output signals based on the plurality of different keyed signals;

providing the one or more current output signals to a coupling element for coupling the one or more current signals to a buried utilities;

receiving, in a utility locator, a keyed magnetic field signal emitted from the buried utility based in flow of one or more of the keyed current signals in the buried utility;

determining locate information associated with the buried utilities based on the keyed magnetic field signal;

decoding a utility type associated with keying imposed on a magnetic field signal received at the magnetic field antenna array;

associating the locate information and the utility type data; and storing the associated locate information and utility type data in the non-transitory memory.

18. The method of claim 17, further comprising providing a visual display on the utility locator of the locate information and the utility type information.

* * * * *